(12) United States Patent
Varhaug et al.

(10) Patent No.: US 11,629,573 B2
(45) Date of Patent: Apr. 18, 2023

(54) MECHANICAL CASING ANNULUS PACKER

(71) Applicant: Archer Oiltools AS, Stavanger (NO)

(72) Inventors: Jarle Varhaug, Stavanger (NO); Atle Løland, Stavanger (NO); Arve Byberg, Stavanger (NO)

(73) Assignee: ARCHER OILTOOLS AS, Stavanger (NO)

(*) Notice: Subject to any disclaimer, the term of this patent is extended or adjusted under 35 U.S.C. 154(b) by 116 days.

(21) Appl. No.: 16/692,803

(22) Filed: Nov. 22, 2019

(65) Prior Publication Data

US 2020/0165893 A1 May 28, 2020

(30) Foreign Application Priority Data

Nov. 23, 2018 (NO) .................................. 20181510

(51) Int. Cl.
*E21B 33/128* (2006.01)
*E21B 33/129* (2006.01)

(52) U.S. Cl.
CPC ........ *E21B 33/128* (2013.01); *E21B 33/1291* (2013.01)

(58) Field of Classification Search
CPC ..... E21B 33/12; E21B 33/1216; E21B 33/128
See application file for complete search history.

(56) References Cited

U.S. PATENT DOCUMENTS

| | | |
|---|---|---|
| 3,559,733 A | 2/1971 | Kilgore |
| 4,765,404 A | 8/1988 | Bailey et al. |
| 2003/0079887 A1 | 5/2003 | Lloyd et al. |
| 2003/0226668 A1 | 12/2003 | Zimmerman et al. |
| 2010/0186970 A1 | 7/2010 | Burnett et al. |
| 2012/0187632 A1 | 7/2012 | White |
| 2020/0072017 A1* | 3/2020 | Rosten .................... E21B 17/20 |

FOREIGN PATENT DOCUMENTS

WO  WO 2018/056951 A1  3/2018

* cited by examiner

*Primary Examiner* — Kristyn A Hall
(74) *Attorney, Agent, or Firm* — Birch, Stewart, Kolasch & Birch, LLP

(57) ABSTRACT

A casing packer seal arrangement includes a sliding casing packer seal assembly arranged for being set by axial compression to expand against a surrounding casing pipe, the casing packer seal assembly being compressed and sled along a cylindrical mandrel. The casing packer seal assembly includes at least one packer element ring having mutually opposite, axially outward facing radially inner and outer plane ring portions; first and second conical inner rings having an axially inward directed plane ring face abutting the packer element end rings' inner plane ring portions in their expanded state; first and second expanding rings each having a conical ramp face for climbing, thus expanding, on said conical inner rings, the first and second expanding rings each having a plane, radially outer ring face for engaging, expanding with and supporting the packer element end ring's axially outward facing plane ring portions, so that when expanded, preventing extrusion of the so expanded packer element end ring in an annulus gap between the expanding rings and the surrounding casing pipe.

22 Claims, 21 Drawing Sheets

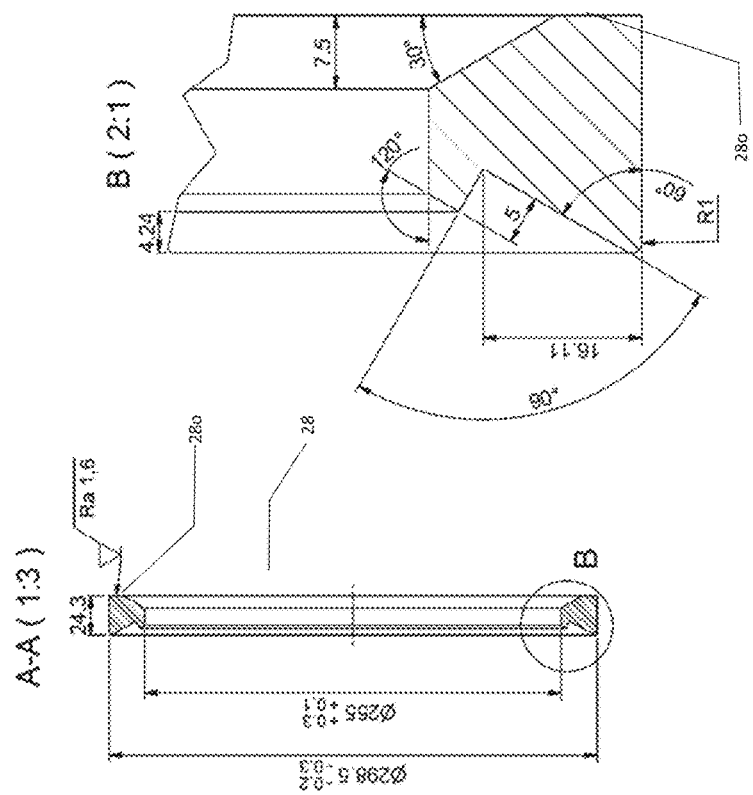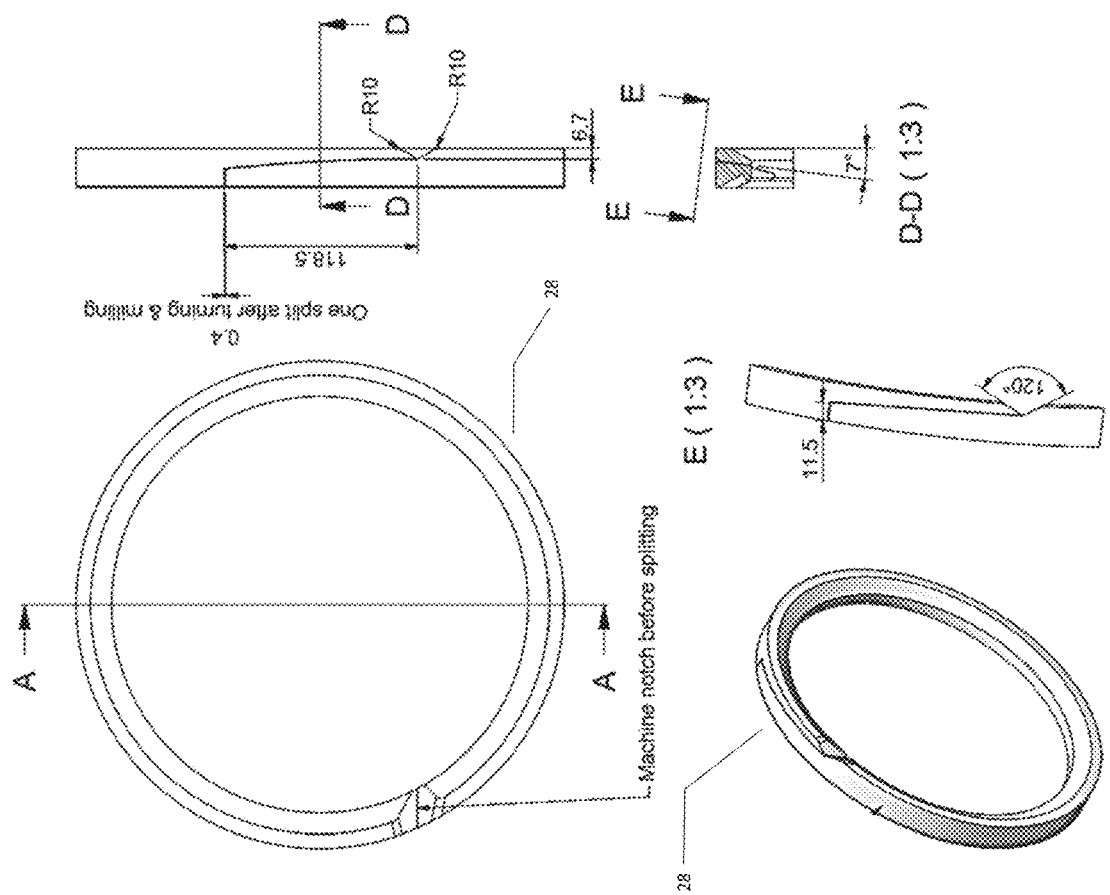
Fig. 3

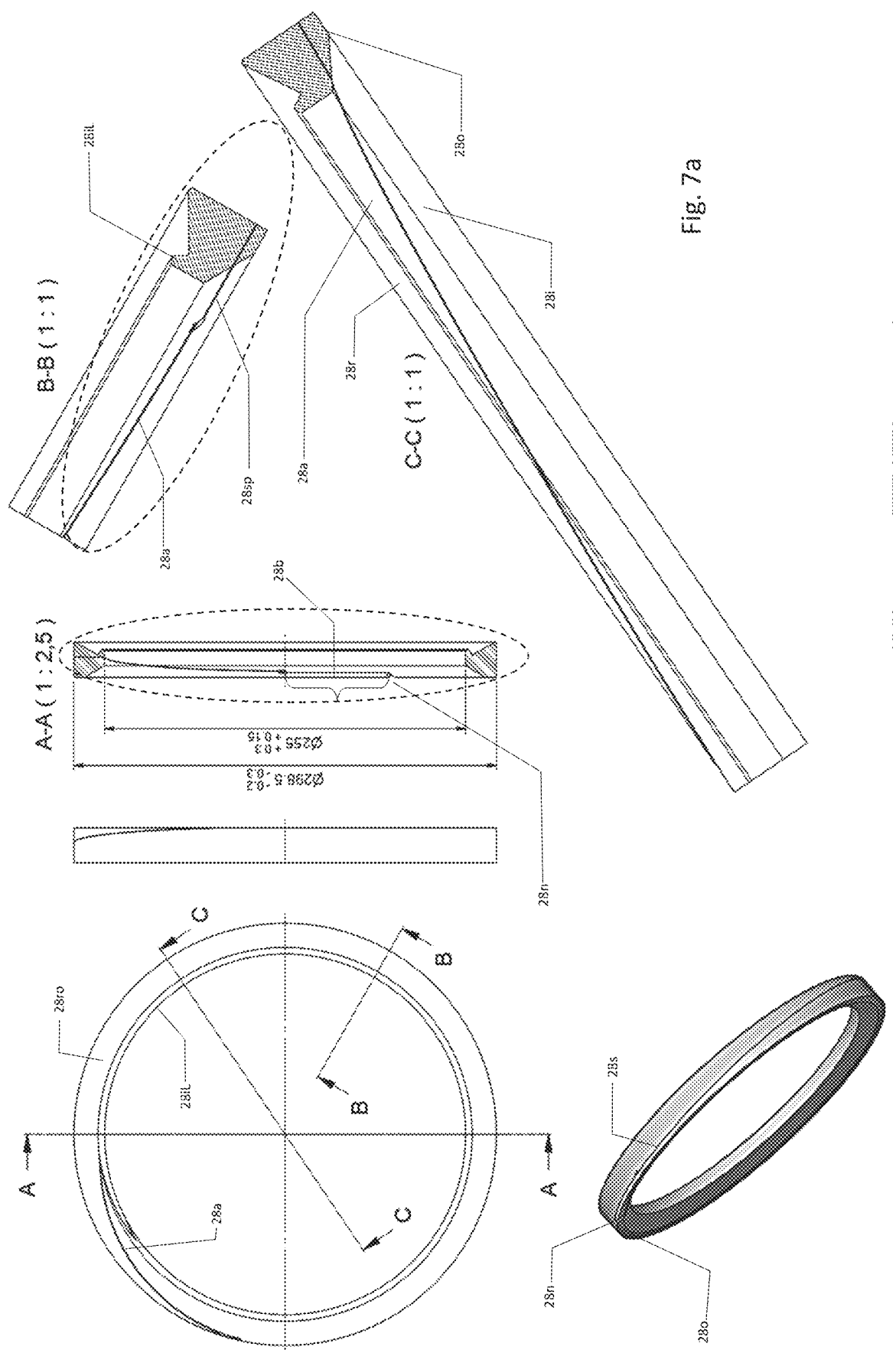

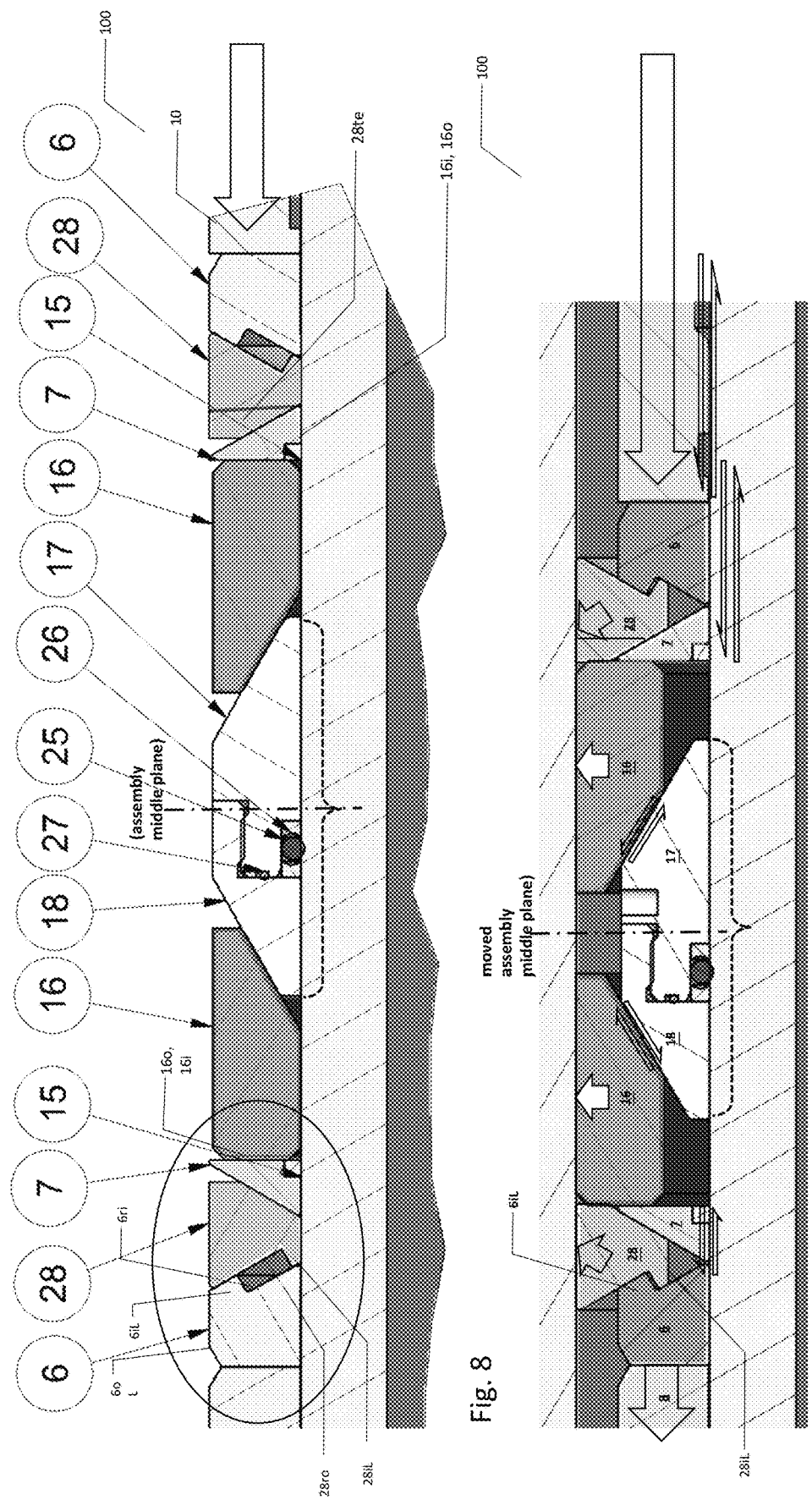

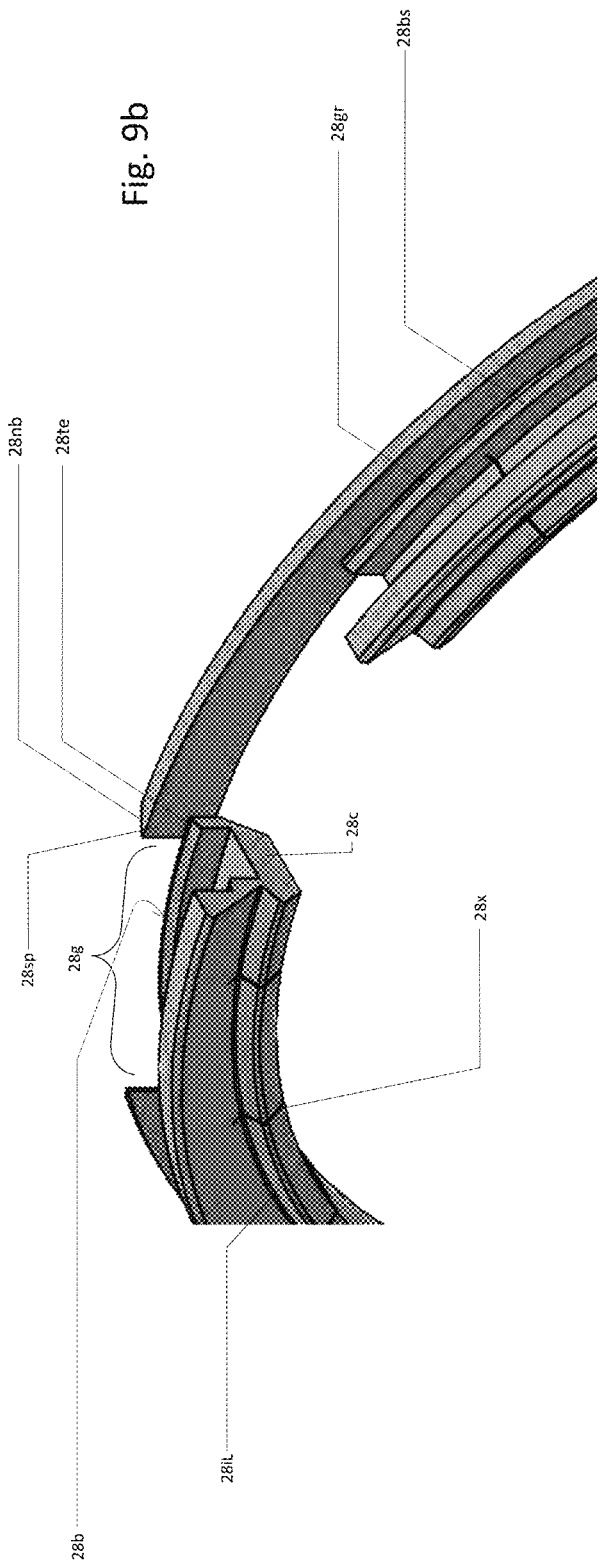

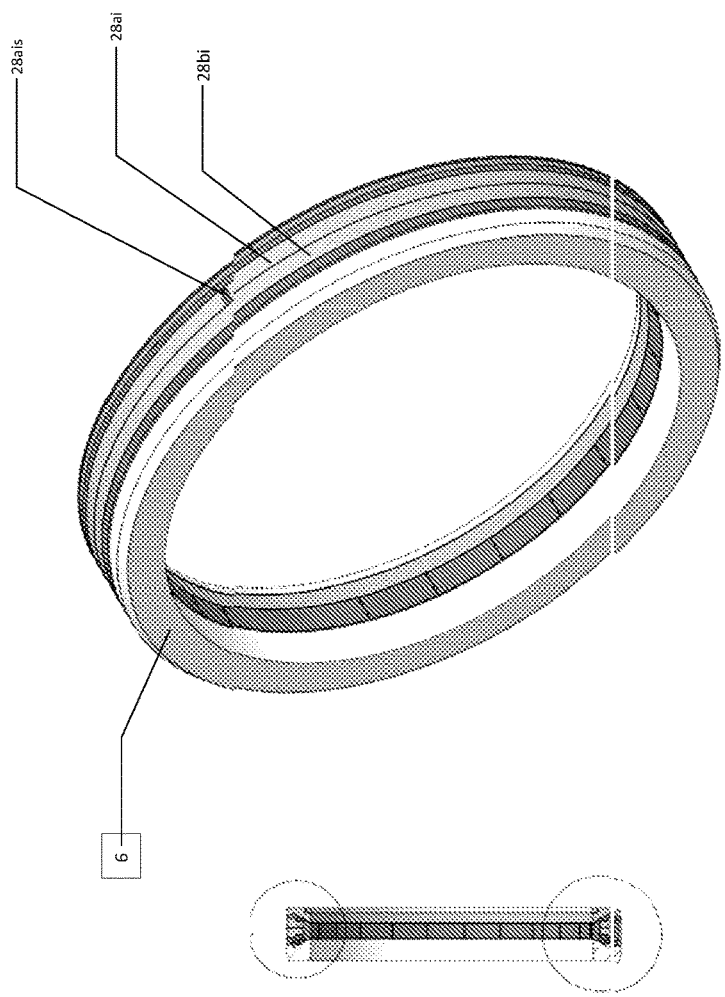
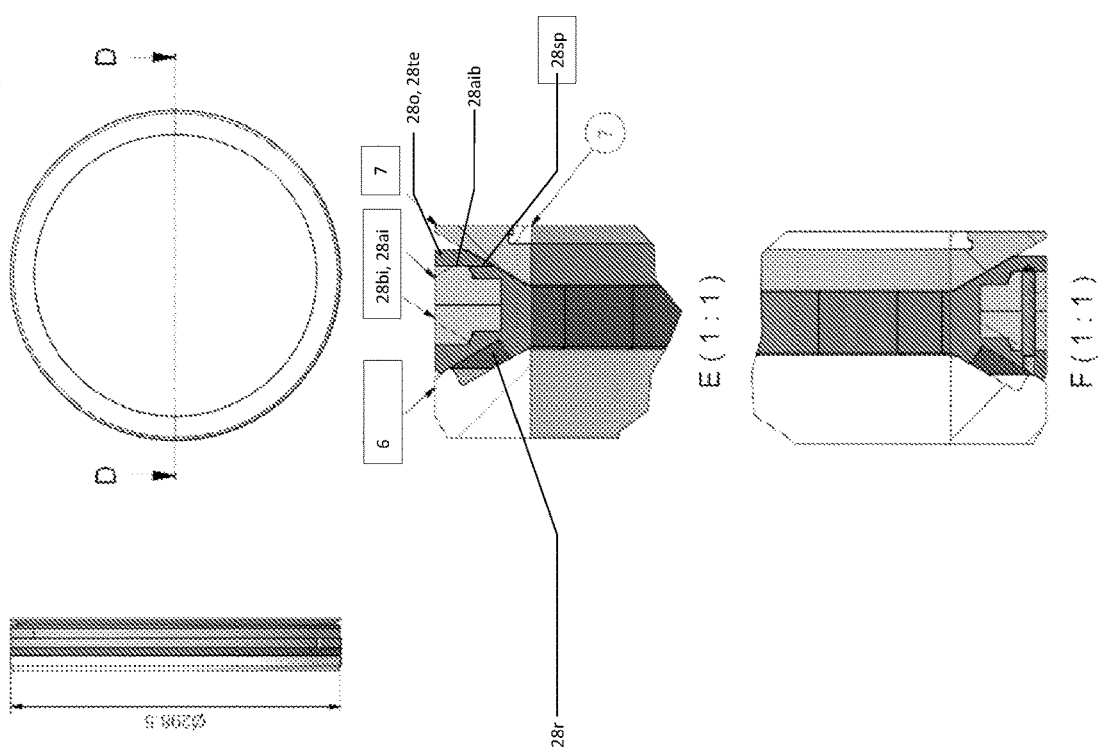
Fig. 9c

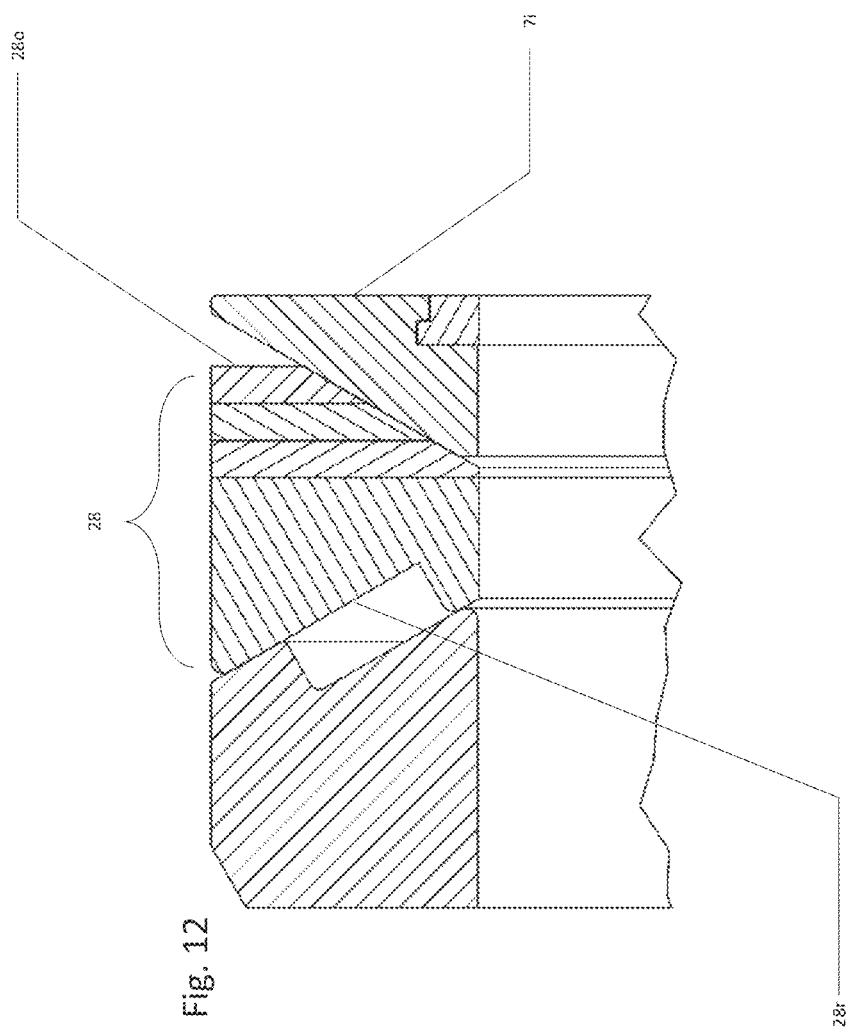

MECHANICAL CASING ANNULUS PACKER

INTRODUCTION

The present invention relates to a mechanical compression casing annulus packer for being arranged between a surrounding casing pipe and a pipe string which comprises the mechanical casing annulus packer of the invention. The mechanical casing packer of the present invention may be used for several tasks:

- for permanently setting a packer between a liner pipe and a casing pipe in a well;
- for use in completion of a well under construction, setting and sealing a completion in a production liner;
- for setting a packer between a patch liner pipe and a casing pipe; and
- other mechanical arrangements where a permanent seal is required between a casing pipe section of a given diameter, such as 9⅝", and a surrounding casing pipe section of a subsequent larger diameter such as 13⅜", or for sealing a 13⅜" casing in a 18⅝" casing.

The casing packer assembly of the present invention may also be used as a sealing arrangement of a bridge plug or a retrievable bridge plug.

The purpose of the present invention is to provide a mechanically set annulus packer for permanent installation, wherein a permanent seal is formed between a casing pipe section and a surrounding casing pipe section, wherein the seal shall be gas-tight according to a standard such as V0. The seal must withstand a high pressure of e.g. more than 443 Bar or 6425 psi, or even up to 690 Bar or 10 000 psi, and the packer must endure being exposed to a chemically aggressive environment of H2S-containing fluids such as water, oil, natural gas, drilling mud, sulphur-oxides and abrasive particles, such as sand. The temperature in the well is elevated both due to the geothermal gradient and due to well processes and may be up to 170° C. The sealing effect is required to last for a very long time, as long as 100 years, in order to prevent undesired petroleum or water leakages, now and far into the future.

BRIEF FIGURE CAPTIONS

The present invention and related background art are shown in the attached drawings, wherein FIG. 13a illustrates an ISO 14310:2008, grade V0 performance test envelope. The pressure is exerted on a sealed mechanical casing annulus packer, wherein the context is illustrated for each quadrant. Pressure (P) is on the horizontal abscissa and force on the mechanical casing annulus packer (F) is along the vertical ordinate. Max pressure is 137.9 Bar=2000 psi. Max pull is 136.2 metric tons. The max push and max pull are almost symmetrically used in all four quadrants; the max push is −113.5 metric tons. The force and the pressure on the sealed mechanical casing annulus packer illustrated in each quadrant are as follows:

| | |
|---|---|
| Upward pull on set inner string with casing annulus packer in fixed casing. | Upward pull on set inner string with casing annulus packer in fixed casing. |
| Pressure from above in annulus on packer. (casing string force and annulus pressure force in opposite directions) | Pressure from below in annulus on packer. (same direction of pull and pressure force) |
| Downward push on casing string. Annulus pressure from above (same force directions) | Downward push Pressure from below (opposite directions) |

FIG. 13b: illustrates a higher pressure standard: ISO 14998: 2015, grade V0 performance test envelope. The pressure is exerted on a sealed mechanical casing annulus packer as illustrated in each quadrant of FIG. 13a. The pressure range here is more severe; −274.1 Bar (P from above) to +442.8 Bar or 6425 psi (P from below). Max push (F) and max pull (F) are the same as above: +136.2 metric tons (pull) to −113.5 (push).

Those are the testing force and pressure limits for the two tests. The test temperature range is 20'C to 130° C., test gas is nitrogen. In the below description, the casing packers are adapted to a 13⅝" casing or to be set in a 17" inner diameter of a 18⅝" casing.

FIG. 1 shows an annotated photograph of a packer end element ring showing damage to a part of the packer cross section. The damage occurred during testing of an early, unsuccessful embodiment of an expanding ring. It is to be noted that the part-spheroidal faulting has propagated inwardly from the damaged, partly extruded edge. Presence of the granular bottom of the remaining cavities near the edge should also be noted.

FIG. 2 is another example of an unsuccessful test of a packer end element ring with damage craters arising during pressure testing, presumably due to mechanical disintegration and extrusion of the packer end element ring. Presence of the spheroidal-like fault formation of craters extending stepwise along the external cylindrical surface, and the granular like remaining bottom of the craters formed, should be noted. One may suspect extrusion radially above the supporting expanding steel ring and/or high pressure gas leakage across the edge.

FIG. 3 shows, in its upper left section, drawings of an early, unsuccessful attempt of a so-called "backup ring", i.e. an expanding ring as further shown in the picture of the tested version of FIG. 4 below. In the upper left section, it is shown a plane view of the so-called front. The expanding ring of FIG. 3 could have been arranged in a casing annulus packer shown in FIG. 6a, but is not applicable because of its deficiencies. This is further discussed in connection with FIGS. 4 and 5.

FIG. 3 also shows the expanding ring with a 6.7 mm deep notch having a 120° opening and being made with an angle relative to the radial line, then a cut slit with 7° angle relative to the frontal plane down to a distance of 118.5 mm wherein a straight cut-out of 11.5 mm is made to the rear surface of the expanding ring. The front faces a ring-shaped outer part of a packer ring's planar rear surface when axially compressed. The conical inner part of the front will climb on a relatively steep, 60"-angled corresponding conical rear face of an inner ring, the front of which again is planar and engages a ring-shaped, radially inner portion of the planar rear surface of the packer ring. Outer ring face is also shown.

FIG. 4 is an annotated photograph of a third tested, failed packer element end ring (40) to the left, with clearly visible damage craters (48) about its portions facing the notch expanded portion of an expanded and deformed, failing expanding ring (42) of the type shown in FIG. 3. Also seen is an underlying wedge-shaped inner ring (44), an inner ring for supporting the so-called backup ring, i.e. the expanding ring, which enables the expanding ring to expand radially and climb radially in order to support the packer end element with its ring-shaped planar outer surface facing the packer end element. The wedge-shaped backup ring 44 compresses the packer element in the axial direction. These rings have been tested on a cylindrical mantle testing device in a larger-bore casing test section. An expanded notch portion (43) and extent of deep damage in packer element end ring (41) may be seen. A tongue (45) adjacent to the packer element end ring (40) has a bulge formed after its compression and expansion. A base tongue (47) of the expanding ring (42) is also shown. As visible in FIG. 4, the peripheral extent (41) of deep damage in the packer element end ring (40) overlaps and exceeds the expanded notch portion length (43) along the base tongue of the expanded expanding ring.

FIG. 5 is a close-up corresponding to the marked rectangle indicated in FIG. 4. In the photograph, the components are only placed loosely in their mutual rotationally correct positions, i.e. they are not assembled under compression. Moreover, the extent of general damage on the packer element end ring may be crudely divided into three parts with generally decreasing severity as counted from the original notch position.

FIG. 6a shows a 9⅝" preset casing annulus packer (60) according to an embodiment of the invention. All relative movements to be executed are indicated by sinistral/dextral arrow pairs.

top: an end view and a lateral view of the packer (60);
an axial section view and partial view of the casing annulus packer (60);
in the middle, enlarged details of packer element end rings (16) and expanding rings (28) before axial compression and radial expansion; and
below the close-up, a set of slips (5) which will expand and engage first when the assembly is axially compressed;
a ratchet lock ring detail between the sliding sleeve and an actuator sleeve;
at the bottom of the sheet, force transfer keys connecting the tool-engageable sliding inner sleeve with the external actuator sleeve.

FIG. 7a and FIG. 7b illustrate a first embodiment of an expanding ring according to an embodiment of the invention, also shown in FIG. 8a. In this embodiment, the expanding ring (28) is made in one solid piece of steel.

FIG. 8 is a detailed longitudinal section of casing packer seal assembly according to the invention, before set and after set (packer shortening not taken into account in FIG. 8). In the upper section of FIG. 8, the ready-for-set casing packer seal assembly is shown, and in the lower section of FIG. 8, the same casing packer assembly is shown in its set position, wherein a moving ratchet housing is forced in from below by a tool and the expanding rings (28) and the packer end elements (16) have been expanded such that they seal against the surrounding casing wall (only shown in the lower part of FIG. 8).

Figure 8A:
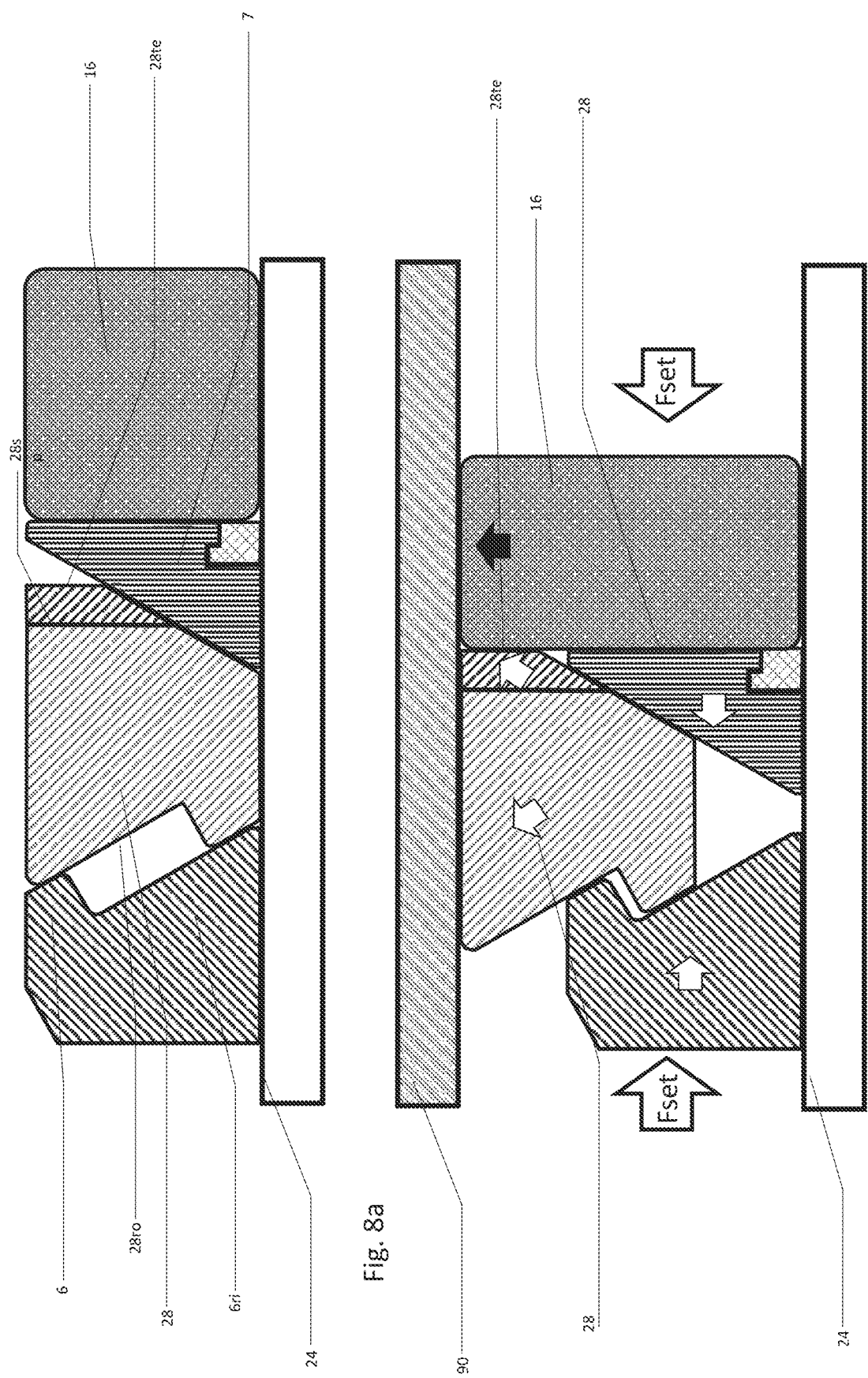
Figure 8B:
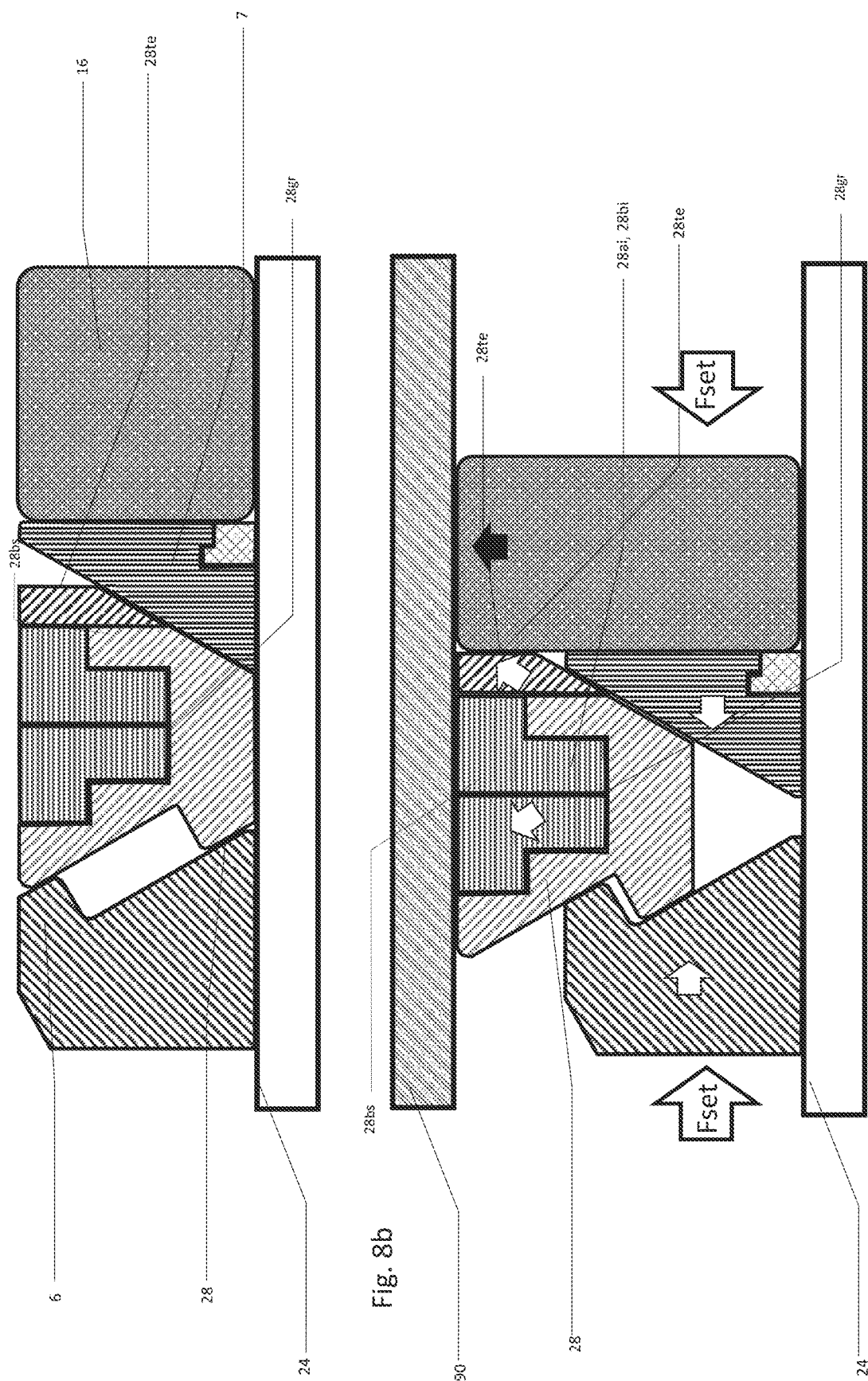
Figure 8C:
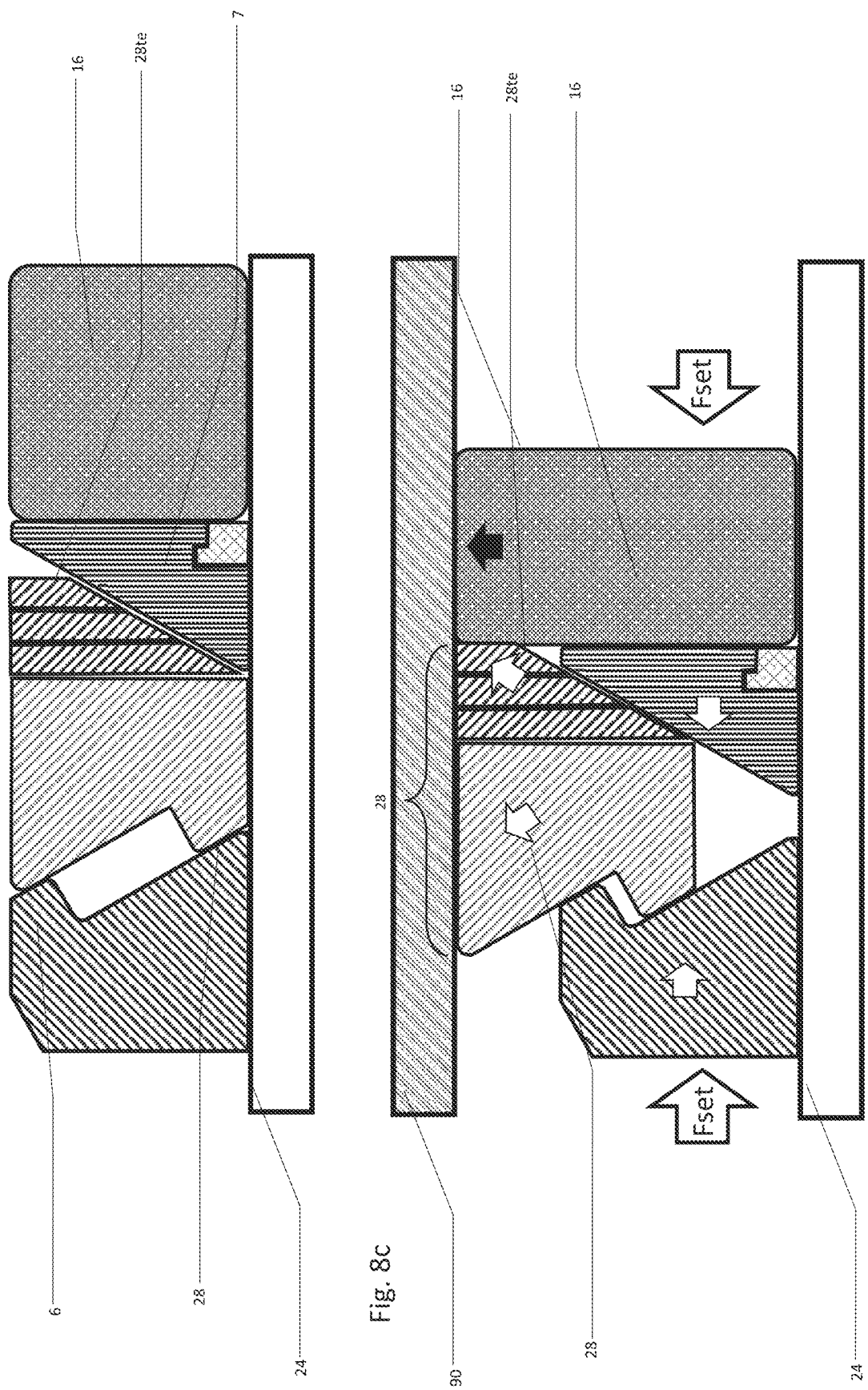

FIGS. 8a, 8b, and 8c illustrate three different embodiments of an expanding ring and packer assembly of the invention, in their ready-for-setting state and in their set state.

Figure 7B:
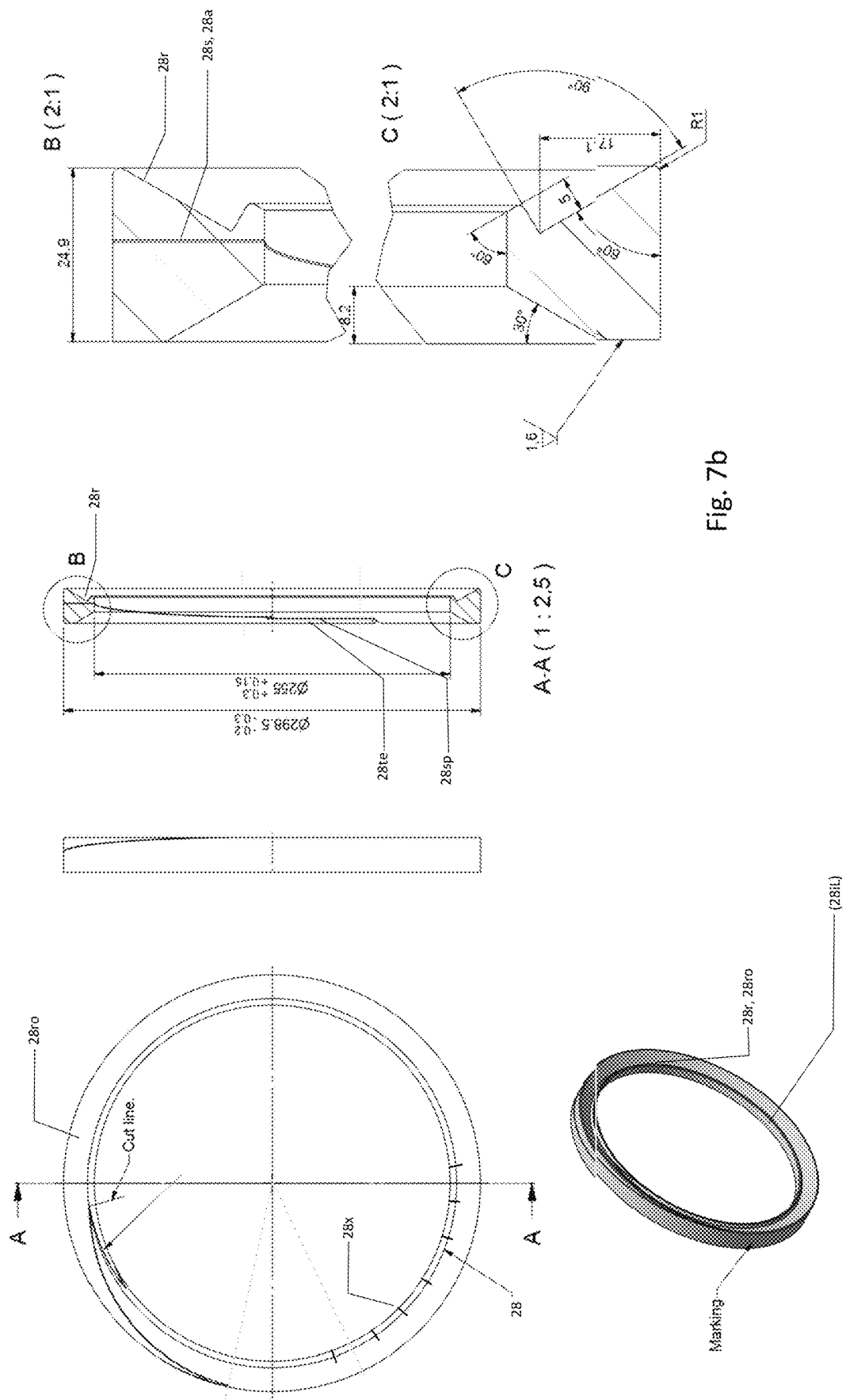

FIG. 8a shows a cross-section of the solid ring assembly corresponding to FIG. 7a and FIG. 7b.

Figure 9A:
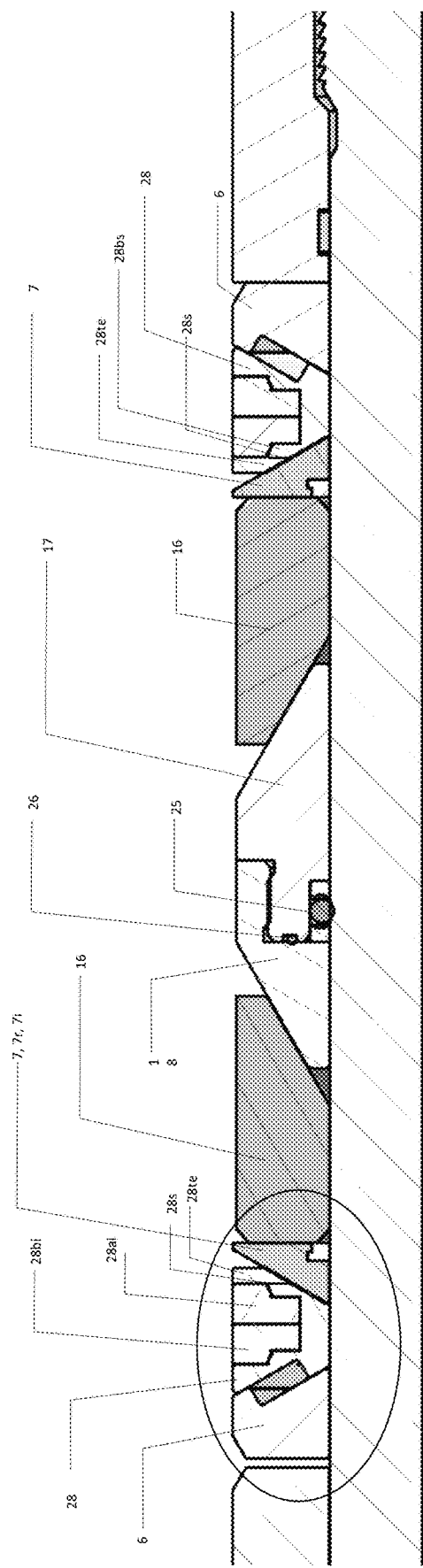

FIG. 8b shows a cross-section of an embodiment of the expanding ring (28) with two internal expanding rings (corresponding to what is shown in FIG. 9a and FIG. 9b) and is a principle longitudinal section of second embodiment of a casing packer seal assembly before set and after set.

FIG. 8c shows a cross-section of an embodiment of the expanding ring (28) with a conical stack of three frontal expanding disc rings (28d1, 28d2, 28d3) ahead of the base expanding ring, all three expanded together with the packer element end ring (16) due to the compression force.

FIG. 9a illustrates a longitudinal section along an embodiment of the casing packer seal assembly of the invention, wherein the expanding ring (28) is designed according to a second embodiment of the invention. FIG. 9b illustrates a perspective view of an expanded gap formed in the base expanding ring part of the above mentioned second embodiment of the expanding ring, the internal expanding ring is omitted from the FIG. 9b. Note the overlap of a tip of the arc-shaped expanded tongue (28te) and a base portion of the shoulder portion (28bs), contributing to this fully expanded ring not collapsing axially under axial load.

FIG. 9c illustrates the embodiment of the expanding ring assembly with the expanding ring (28) with two internal expanding rings (28ai, 28bi), both arranged between an inner cone ring (7) for facing the packer end element (16) and an outer cone ring (6), the two cone rings handling axial forced radial expansion of the packer seal rings. A corresponding expanding ring assembly is to be arranged opposite the expanding ring(s) (28).

Figure 10:
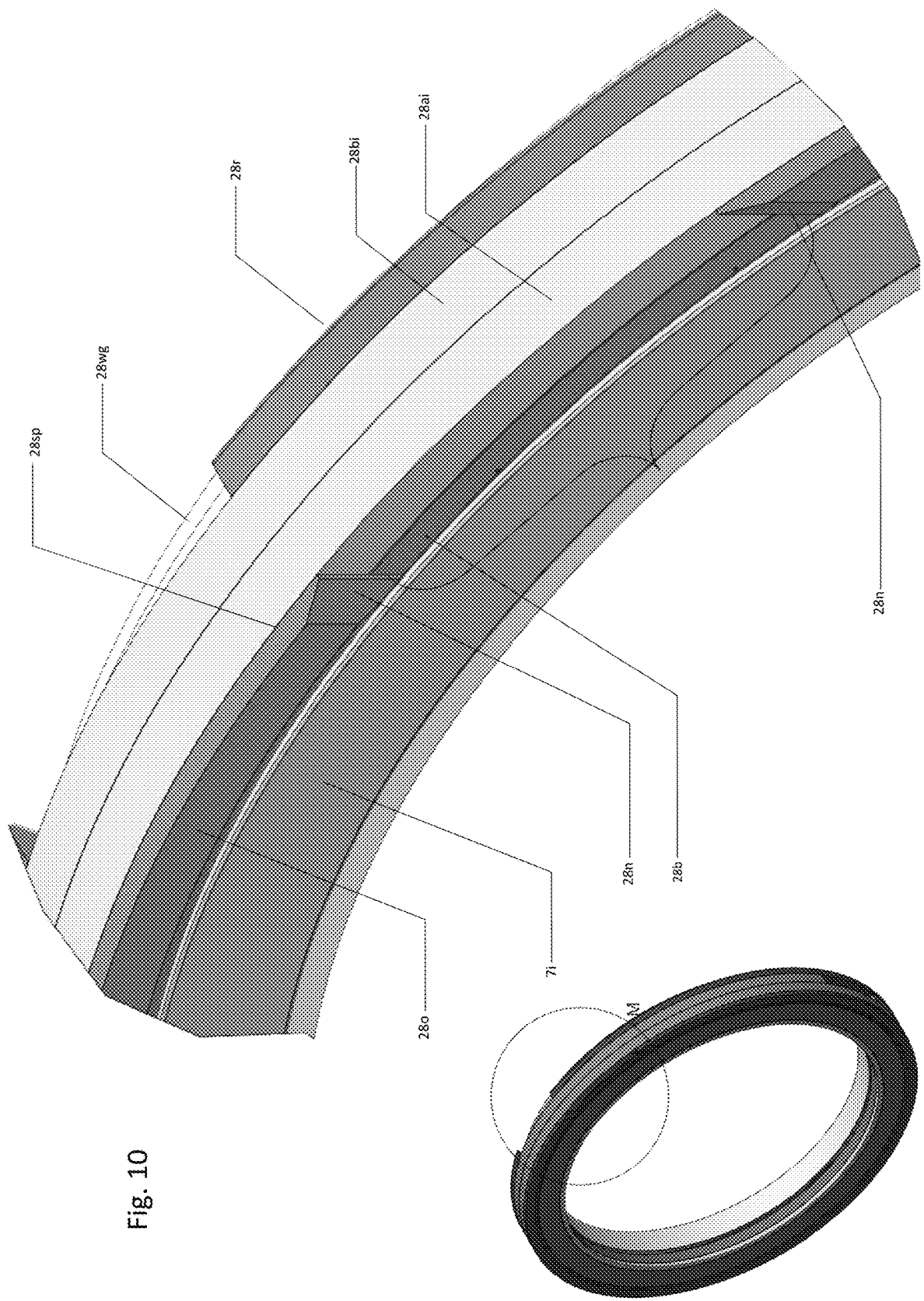

FIG. 10 is a perspective of an expanded ring of the embodiment shown in FIG. 9c, and an enlarged portion of the gap-forming portion showing the arc-shaped recess bottom which will be forced against the packer end element (16) plane outer rim portion (16o; part of which will be deformed into the recess). The recess here has beveled ramp surfaces against the packer end element, and it is rather shallow, so the deformation bulge-out of the outer rim portion (16o) into the groove is so small that rupture deformation of the packer end element (16) is avoided. The straight gap at the rear portion of the expanding ring, where metal is in contact with metal, is less significant, except for the gap itself, which is mechanically supported across the dual internal expanding rings (28ai, 28bi).

Figure 11:
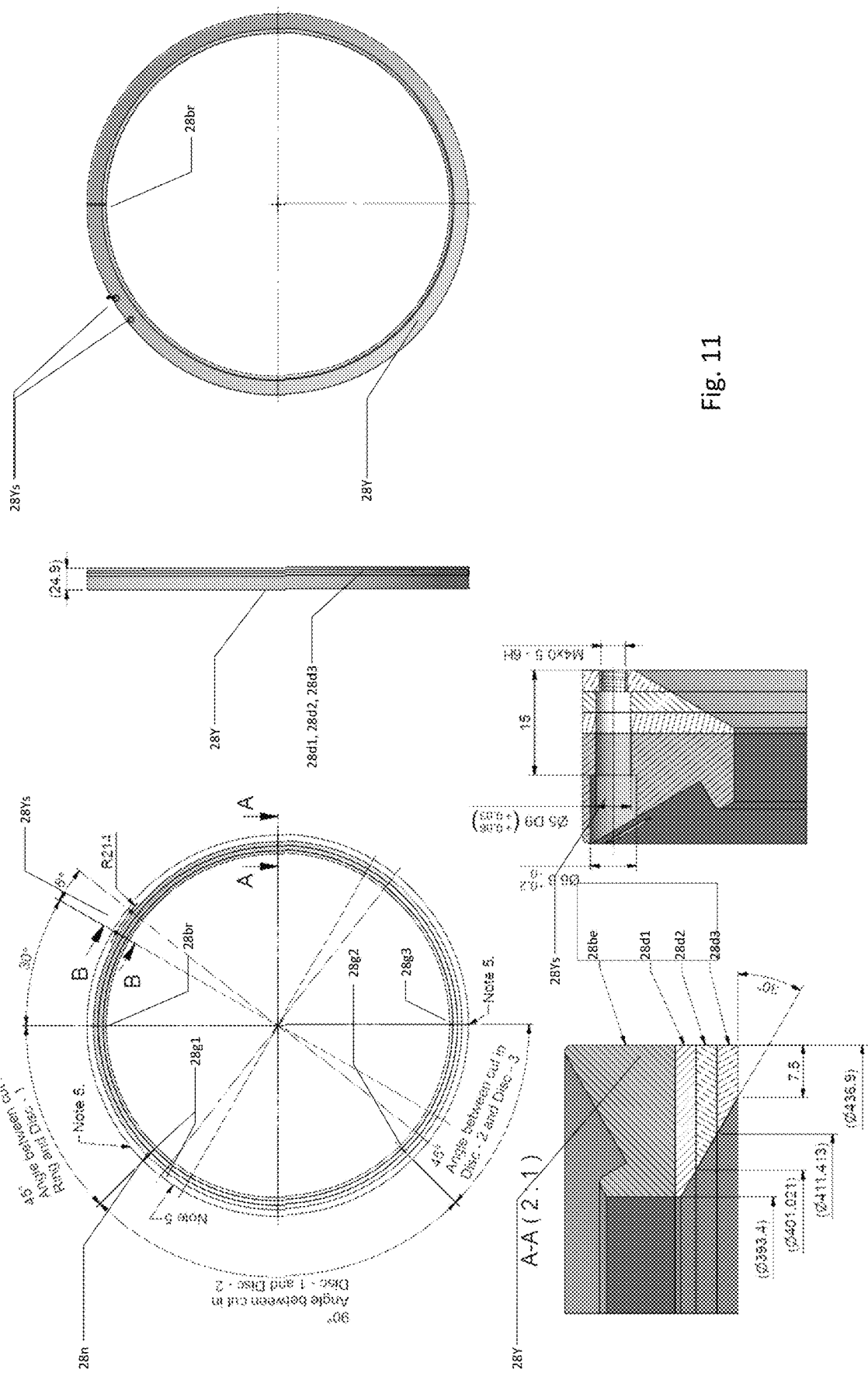
Figure 13A:
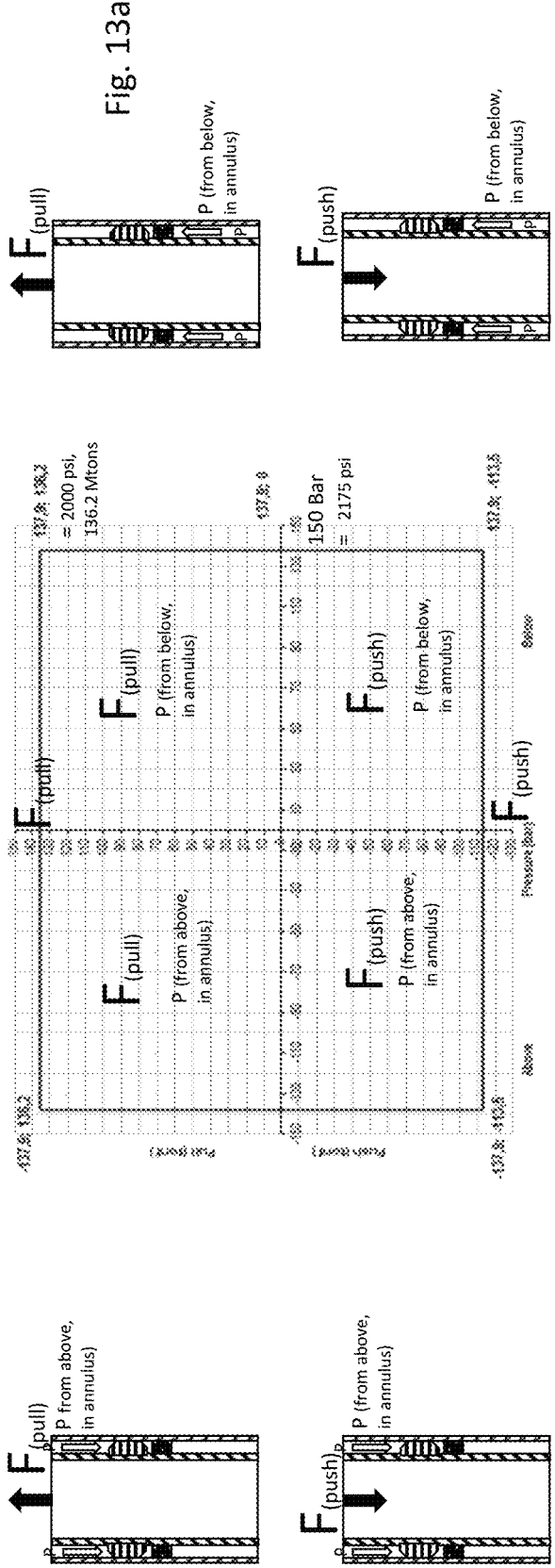
Figure 13B:
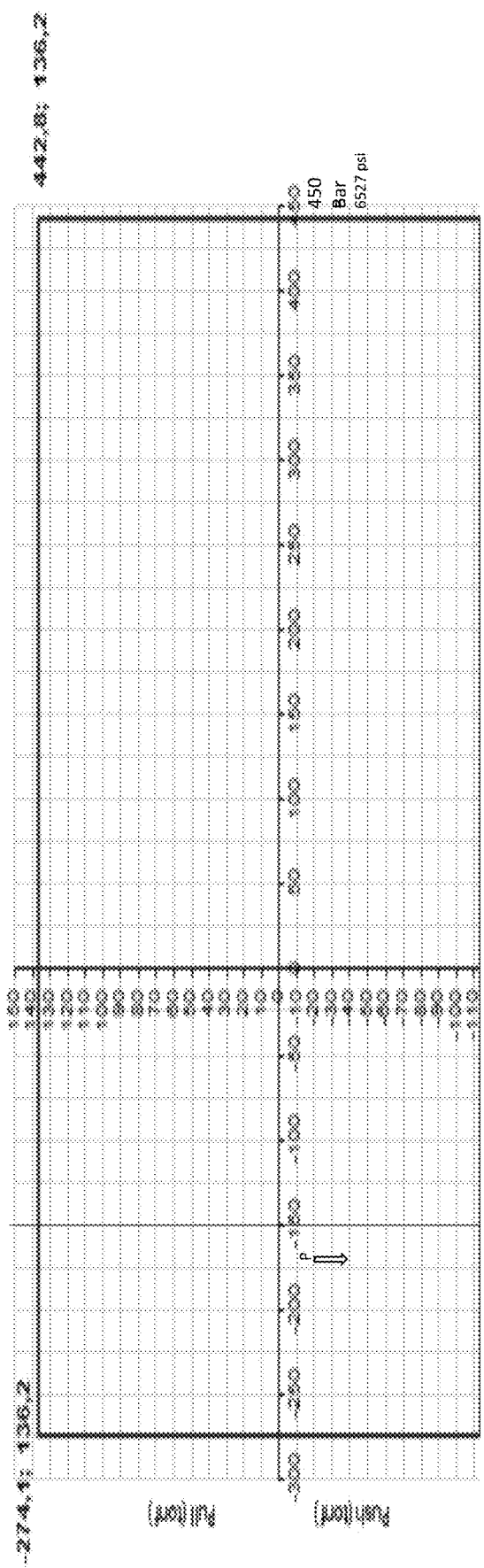

FIG. 11 is an embodiment of the invention, showing a third embodiment of the expanding ring (28) comprising a rear conic base ring (28Y) and including a fore, internally conic, stack of three discs (28d1, 28d2, 28d3) which are fixed together at one point with the base ring, all in an unexpanded state. Each disc (28d1, 28d2, 28d3) has a cut gap so that it may expand. The radially slimmest disc (28d3) may have a notch (28n) forming the slit/gap (28g1) which forms part of a through-slit (28s).

FIG. 12 is a cross-section of the expanding ring (28) shown in FIG. 11.

BACKGROUND ART

A drill pipe string conveyed running tool is required for setting the packer of a large-bore casing section in the present context. The running tool has an external dog key profile which fits in an internal ring-shaped lock profile of a corresponding internal setting sleeve in the packer casing section. The ring-shaped lock profile is connected via radial connection pins through slits in the static packer casing section body. The radial connecting pins hold a compression setting sleeve which is pushed upwardly to compress and thus expand the packer to engage with and seal against the surrounding casing pipe's inner wall.

A general problem in the art is to avoid undesired deformation of the packer during setting, and also subsequent deformation, both due to extrusion of the packer material through the annular gap between the packer casing section and the surrounding casing section, or through internal pathways in the compression setting mechanism. Another problem is to avoid leakage of the packer.

Traditional packer element rings experience a problem during axial compression. More precisely, the problems occur during extrusion of the packer element ring in an unsupported radial ring surface portion of the packer element ring through a radial gap between outside of a compression ring and the surrounding casing section when the packer is sealing. The result is that the entire packer element ring cracks up, becomes granularly eroded and loses its sealing effect. The consequence is that such a packer element ring may have compression pressure limits that do not meet the practical or safety requirements for sealing off an annulus of a casing portion within a larger casing portion. Low sealing pressure may result in leakages and erosion which incurs accelerating leakages.

The compression ring may be split in order to make an expanding compression ring which expands during axial compression and supports the packer element ring further out in order to reduce such an external radial gap, and also supports the split ring and the radially inner face ring portion of the packer element ring. An orthogonally cut split ring will expand easily, however the gap will not support the expanding packer element ring and will incur an extrusion through the rectangular gap formed in addition to opposite shear deformation on either sides of the gap, and will easily ruin the packer through extrusion and shear deformation, even under low mechanical force axial pressure during setting.

A short, slant cut expansion ring will also incur a single-side shear deformation and extrusion. This creates a large oblique ramp, one portion of which intrudes into the packer end element during compression and results in expansion, further initiating a shear deformation and damage, and opens for extrusion and is only marginally less severely affecting than a straight cut expansion ring.

US2010/0186970 discloses a support assembly for a deformable sealing element of a downhole tool, such as a packer. The assembly comprises two support devices. Each device comprises a support member with a plurality of radially expanding segments located on an outer surface thereof. Each support member comprises two annular members. The first annular member is constructed from an annular ring. A number of radial slots are cut in the annular ring, and these include a number of inner slots and a number of outer slots. The inner and outer slots are spaced alternately around a circumference of the annular ring and each terminates in a substantially circular aperture. Such apertures assist in allowing the annular member to expand as it is increased radially outwardly and also retract when released. This makes the ring flexible so that it may can take up a number of shapes.

WO2018/056951 describes a method of retaining a packing element by means of expanding a wedge shaped spiral ring between the retainer and the packing element. It is thereby formed a labyrinth seal that prevents packing element extrusion.

US2003/0226668 relates to a method and apparatus for sealing an annulus in a wellbore. It discloses a sealing system having a set of slips. The slips are arranged to overlap the support rings. Inner surfaces of the resp. slip are tapered to complement the outer surface of the support rings. Outer surfaces of the resp. slip include an outwardly extending serration or edged tooth to engage an inner surface of the surrounding casing when the slips are driven radially outward from the mandrel.

U.S. Pat. No. 4,765,404 deals with improving sealing arrangement of the packing assembly in a well casing. The sealing is achieved through radial expansion of a compressible sealing element. Prohibitive extrusion is prevented by means of an array of circumferentially arranged, axially extending expansion fingers. The solution of U.S. Pat. No. 4,765,404 is ridden with drawbacks, e.g. there is a substantial risk that the sliding expansion ring, in response to an axial compressive force, axially invades the extruded packing element.

Further Problems Related to Background Art and Development

Figure 4:
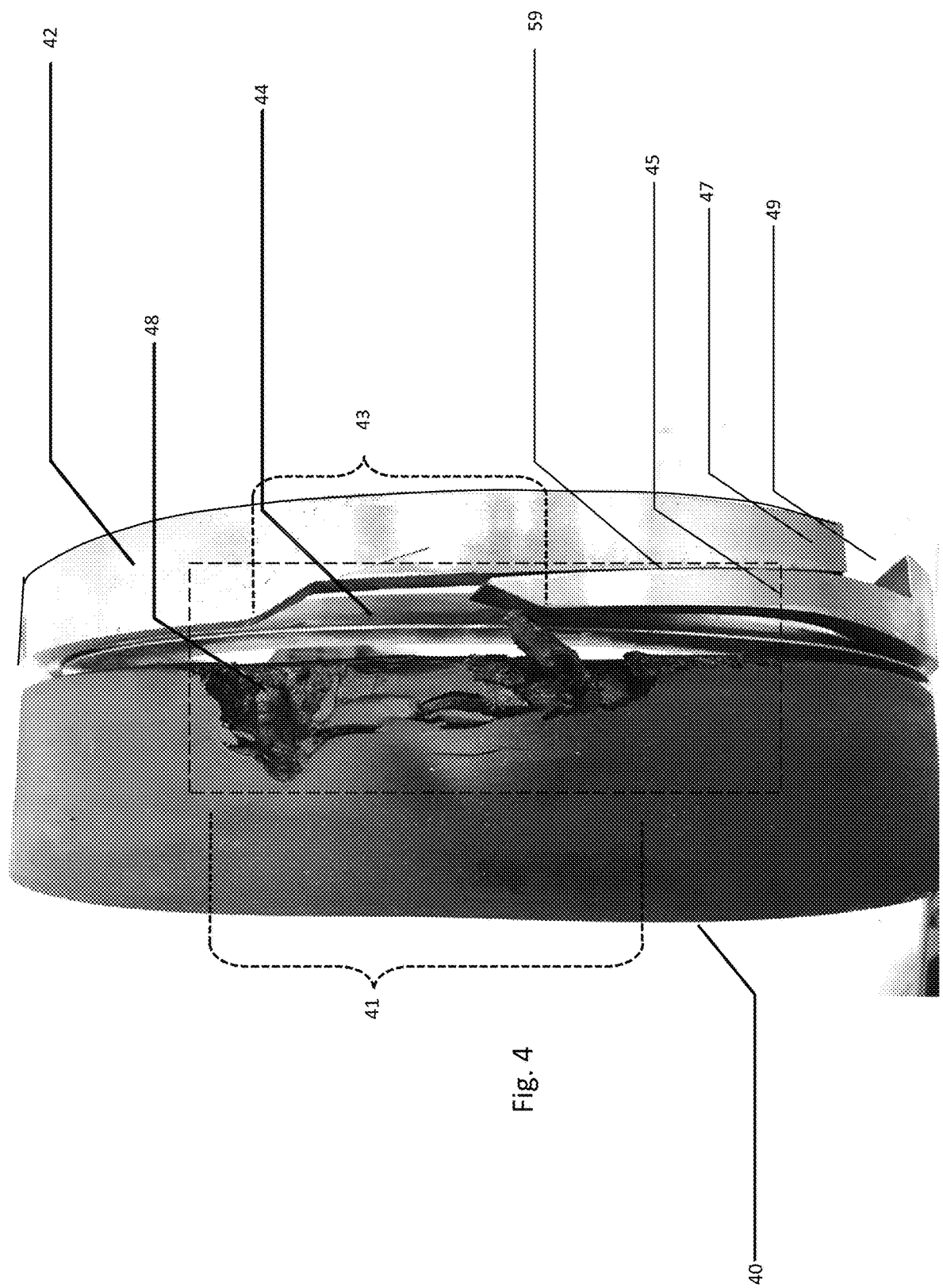

In further attempts to solve the problems of deformation of the axial compression packer end element, a low-angle slit dual bridge expanding ring combined with a wedge-shaped backup ring supporting the radially outer and inner ring surfaces of the expanding packer end element, as shown in the technical design drawing of FIG. 3. i.e. non-deformed and without damage, and rendered as a post-test image of FIG. 4.

Figure 1:
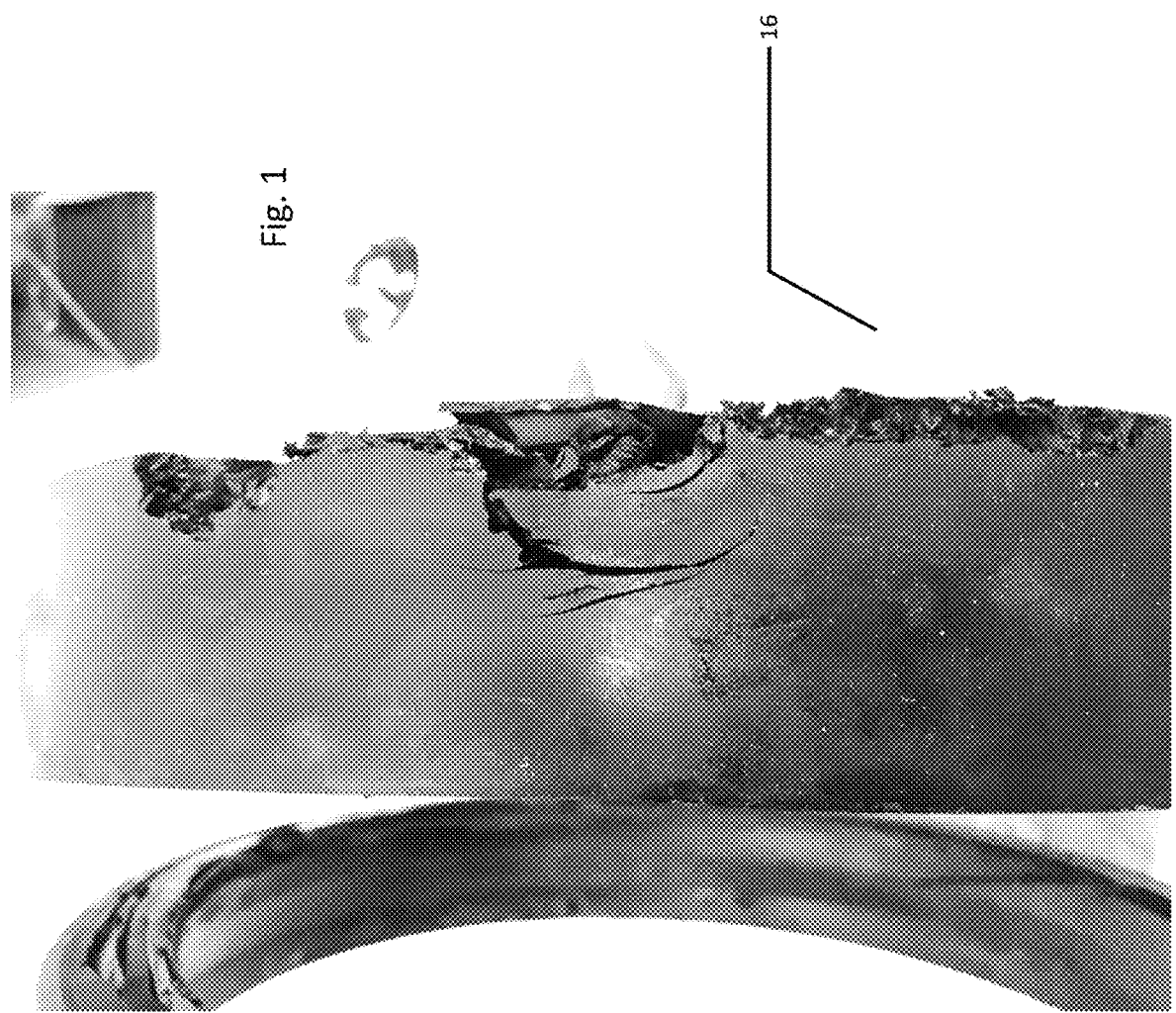
Figure 2:
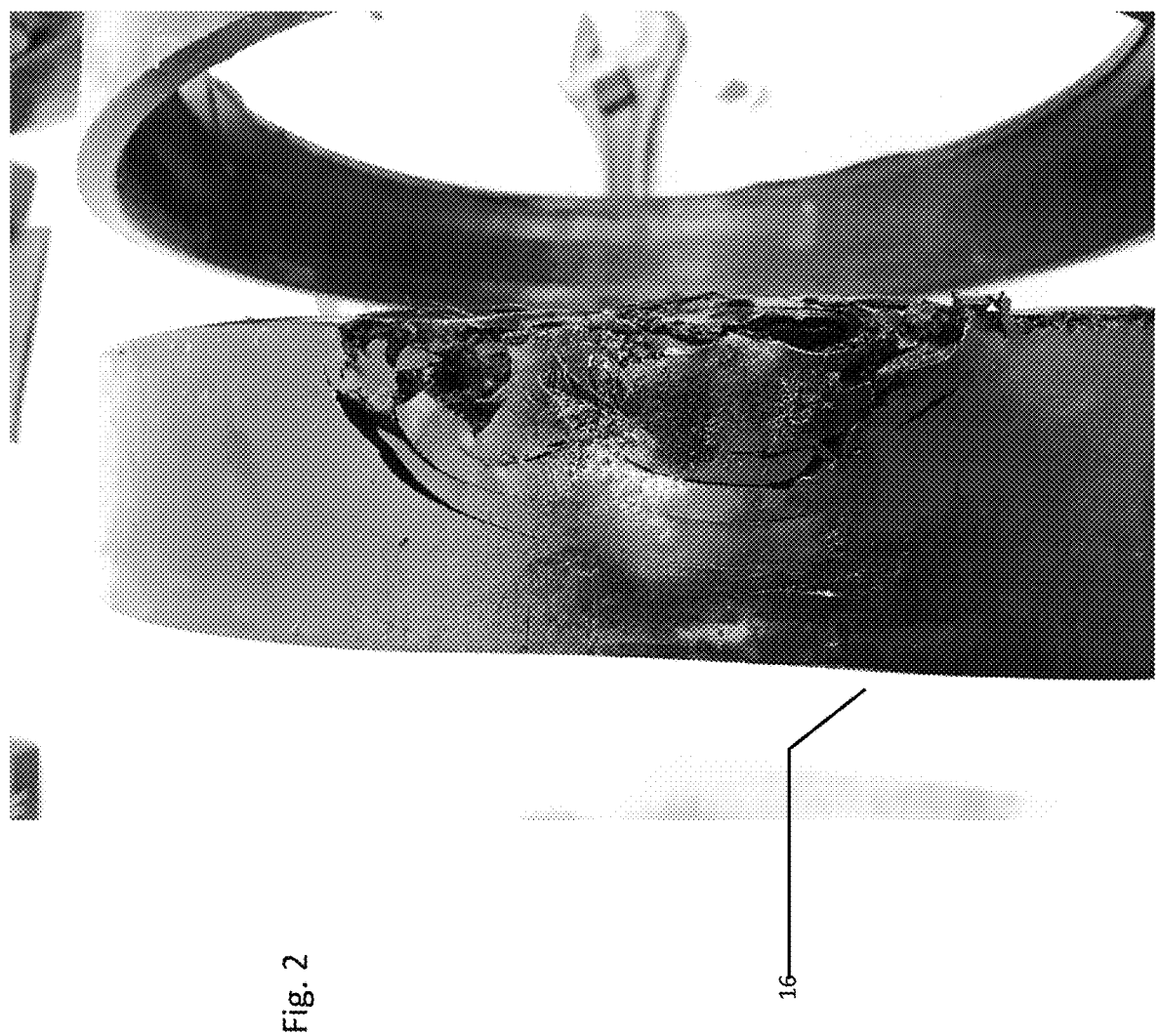

FIG. 1 and FIG. 2 show damaged packer end elements resulting from tests preceding the one discussed in connection with FIG. 4.

Turning back to FIG. 3, it is shown an expansion ring made in a failed attempt to overcome the above mentioned problems. An expansion ring of height 24.3 mm and Ø298.5 mm is split between a 6.7 mm deep notch with a 120° blunt notch across one portion of the ring, followed by a 118.5 mm long expansion slit, with 7° oblique angle and falling off 4.1 mm to an orthogonal slit out of the opposite surface. The low fall-off of 4.1 mm and the oblique, 6.7 mm shallow slit were intended to entail limited extrusion and limited granular erosion of the packer. However, this design failed, as seen in the images taken after disassembly of the tested packer assemblies.

FIG. 4 shows an image of a packer element end ring (40), with damage to part of the packer profile, and (to the right) an expanding ring (42) used during the setting and compression of the packer element end ring (40), which is expanded and deformed during the axial compression setting of the packer. Also seen inside the left portion of the expanding ring and facing the end element packers flat ring-shaped face, is a wedge-shaped backup ring (44) which forms a radially inner ring face which together with the outward climbing, radially outer ring face of the expanding ring (42), compresses the packer element in the axial direction.

In FIG. 4, the notch (shown and discussed in connection with FIG. 3) has expanded along the slit to two 30°—ramps, both 6.7 mm high, and the base straight slit cut portion (49) in the rear plane, i.e. facing away from the packer, has opened up. The expansion of the ring is about 75 mm along the low-angle slit. It can be seen that the packer-adjacent tongue (45) of the expanding ring (42) is bent at its base near the straight gap. There is a damage range affecting nearly half the thickness of the packer end element, the damaged range being near and adjacent to the expanded notch portion length and facing the expanding ring. FIG. 4 also shows a slit (59). This is further discussed in FIG. 5.

Figure 5:
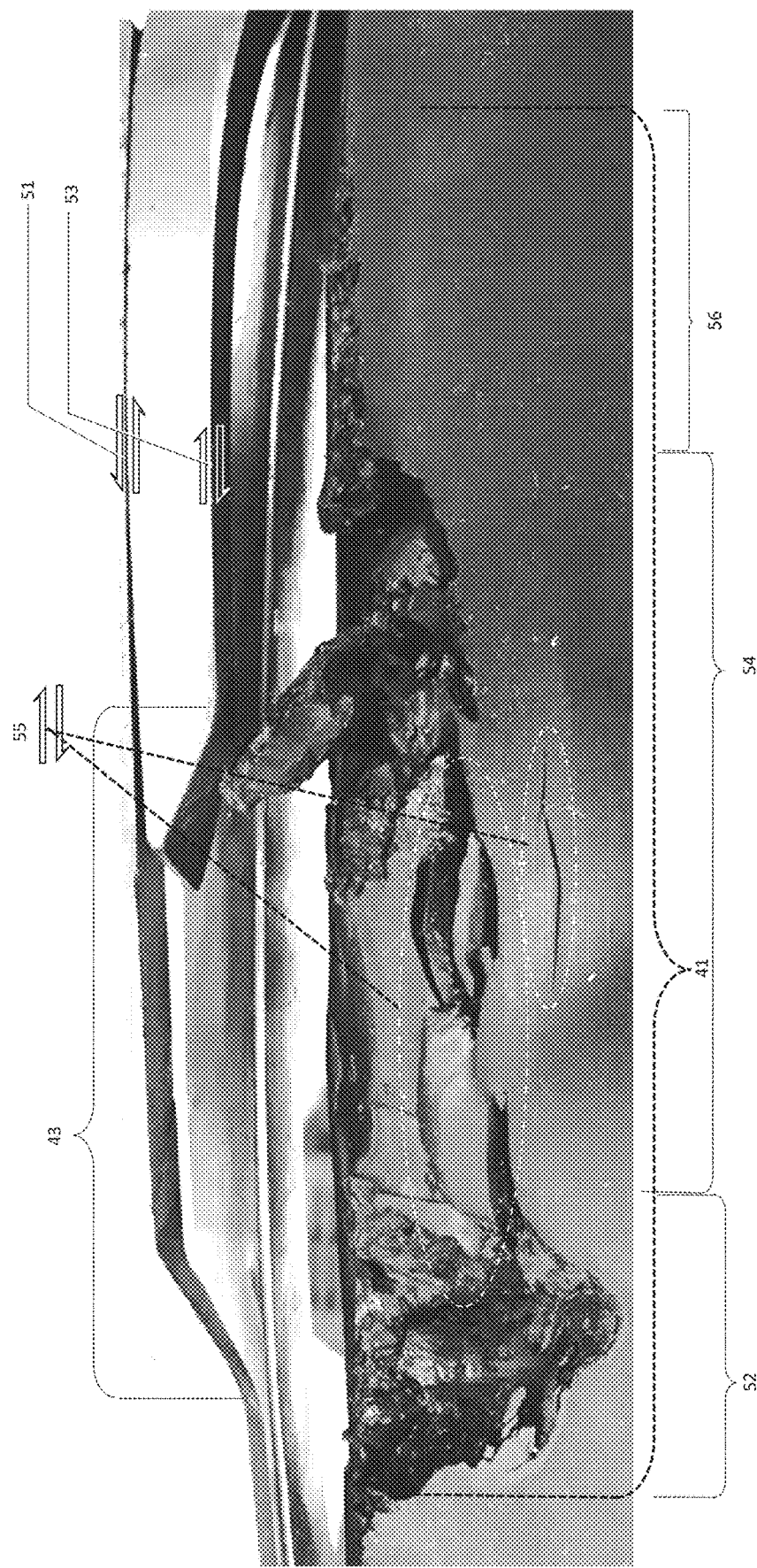

FIG. 5 is a close-up corresponding to the marked rectangle indicated in FIG. 4. It should be noticed that in the photograph the components are only placed loosely in their mutual rotationally correct positions, i.e. they are not assembled under compression. Further, the extent of general damage (41) of the packer element end ring may be crudely subdivided into three parts with generally decreasing severity as counted from the original notch position:

Firstly, a left range (52) of deeper extrusion and/or granular bottomed erosion about the position of the original, unexpanded notch. It is assumed that extrusion of the packer element end ring has started here, expanding into the notch and being subject to high tensile and shear stress, and possibly later subject to material erosion due to high pressure gas passage.

Secondly, a mid-level range (54) of less deep extrusion and/or transverse crack-controlled exfoliation which may have occurred as the packer has been extruded in the wider gap across the now exposed base tongue of the expanding ring. We assume that the expanding ring has some hysteresis after being released and may be partly closed with respect to its widest gap. The base tongue exposed gap may have been wider than when photographed. Part of the deformation in this range and in the crack behind may indicate dextral deformation which may be due to the dextral shear exerted by the right hand movement during expansion of the steel tongue.

Thirdly, an end range (56) of shallower, granular edge erosion decreasing into erosion-free portion. Small lugs or tongues bent in the same direction along this edge interface indicate dextral shear in addition to the granular erosion. We also see that the tongue is deformed near this end range which contributes to reduced steel support of the polymer ring in this portion. Moreover, (51) denotes mutual sinistral setting expansion movement along slit between base tongue and packer-adjacent tongue. Also, (53) denotes dextral shear force between packer-adjacent tongue and the packer end element face when expanding the expanding ring, whereas (55) shows dextral shear forces and consequential extrusion-indicating deformation cracks.

Generally, we interpret the damage of the packer end element ring to be due to, first, extrusion deformation and erosion-induced gas leakage near the notch; secondly, shear deformation and extrusion and erosion-inducing gas leakage along the widening notch gap, and third, shear deformation and some erosion-inducing gas leakage along the remainder of the affected portion.

BRIEF SUMMARY OF THE INVENTION

The invention provides a solution to the above-mentioned problems. The invention is a casing packer seal arrangement, comprising a sliding casing packer seal assembly (100) arranged for being set by axial compression to expand against a surrounding casing (90), said casing packer seal assembly (100) being compressed and sled along a cylindrical mandrel (24), said casing packer seal assembly (100) comprising:
  at least one packer element ring (16) having mutually opposite, axially outward facing radially inner and outer plane ring portions (16o, 16i),
  first and second conical inner rings (7, 7r) having an axially inward directed plane ring face (7i) abutting said packer element end rings' (16,) inner plane ring portions (16i) in their expanded state,
  first and second expanding rings (28) each having a conical ramp face (28i) for climbing, thus expanding, on said conical inner rings (7), wherein said first and second expanding rings (28) each having a plane, radially outer ring face (28o) for engaging with, expanding with and supporting said packer element end ring's (16) axially outward facing plane ring portions (16o), so that, when expanded, extrusion of said so expanded packer element end ring (16) in an annulus gap between said expanding rings (28) and a surrounding casing pipe is prevented.

The invention is defined in claim 1. Further embodiments are defined in the dependent claims and are described in the below description of embodiments of the invention.

DESCRIPTION OF EMBODIMENTS OF THE INVENTION

Below, the invention and embodiments of the invention are described. The invention is a casing packer seal arrangement, shown inter alia in FIG. 8, FIG. 8a, FIG. 8b, and FIG. 8c. A reference to FIG. 9a is also made. The invention comprises several technical features, including a sliding casing packer seal assembly (100) arranged for being set by axial compression to expand against a surrounding casing (90). This casing packer seal assembly (100) is arranged for being compressed and sled along a cylindrical mandrel (24) between a position ready to set, and a compressed position when the packer seal assembly is set.

Figure 6A:
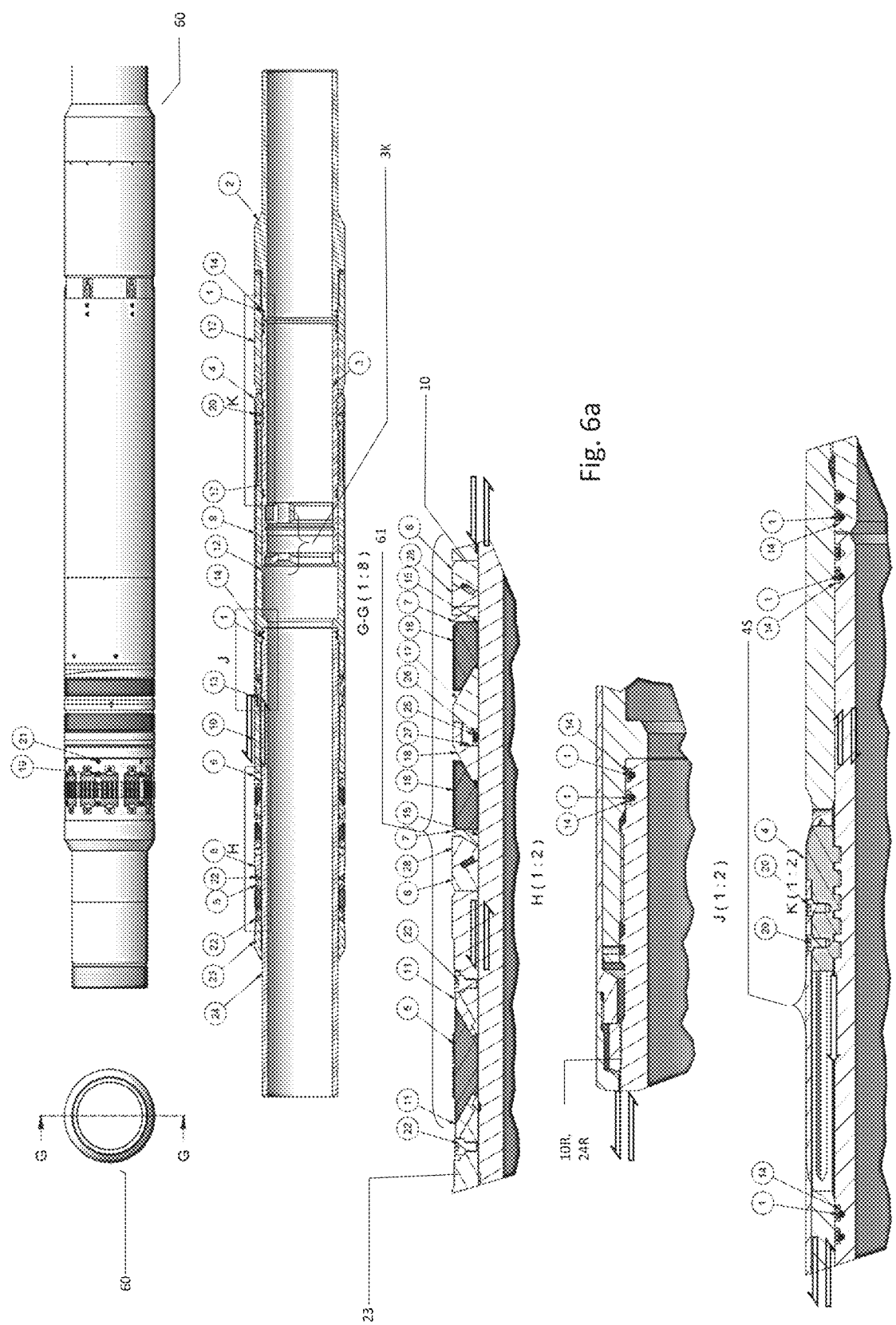
FIG. 6b shows views corresponding to those of FIG. 6a, but in the set state of the casing packer assembly.

A casing annulus packer (60) is shown in FIG. 6a. For the sake of brevity and simplicity, various components are only thoroughly described once, typically the first time they are mentioned. In the top view, a cylinder head cap screws (19, 21) are indicated. In the subsequent view, an axial section view and partial view of the casing annulus packer (60) are shown. Here, an O-ring (1) seals between end sub (2) and an inner sleeve (3). The end sub (2) is used for mounting into subsequent liner pipe section. The inner sleeve (3) has an internal ring groove for running tool key profile. It is provided an internal key profile (3K) for an actuator tool such as a drill pipe string conveyed dog tool. A force transfer key (4) in a number of six and arranged through six axially directed slots (4S) along the packer mandrel (12). Slips (5) are arranged to be radially expanded and pressed towards the inner face of a surrounding casing pipe. An outer ring (6) is a steeply inclined wedge ring for being pushed axially by ratchet housing (10), and for pushing axially onto expanding ring (28) to expand it. Provided with an outer radial expansion limiter. Moving slips ring (8) is also shown. A transfer sleeve (9) for outer force is a thin-walled outer sleeve connected to a ratchet housing (10) and sliding on the packer mandrel (12) pipe. The ratchet housing (10) abuts axially against outer ring (6) to slide and compress the packer arrangement and the slips arrangement axially. A guide rail (11) is used for holding and guiding the slips (5) climbing along the moving slips ring (8) and fixed slips end ring (23).

A packer mandrel (12) is provided with six axially directed slots (4s) for six corresponding force transfer keys (4) along the mandrel (12). A ratchet ring (13) is arranged internally in ratchet housing (10) for one-way compression ratching along corresponding ratchet grooves on a mandrel pipe (24). The ring locks expanded slips and packer. A back-up ring (14) for the O-ring (1) is used for sealing between sliding inner sleeve (3) and static end sub sleeve (2). Fixing screws (22) for the guide rail (11) are also shown. Further, fixed slips end ring (23) form an end ramp for expanding the slips (5), the end ring (23) being threaded onto a mandrel (24). O-rings (25, 27) seals against the mandrel (24) under the conical element rings (17, 18). A ring (26) is a backup ring for the O-ring (25).

An inner ring (7) is a steeply inclined wedge ring with plane ring surface for abutting against axial outer face of an element end ring (16) and a steeply inclined axially opposite side for an expanding ring (28) to climb on while expanding. Together, in the expanded state, they form a plane ring surface which prevents axially directed external extrusion. The packer element ring (16) is made in TFE/P (tetrafluoroethylene/propylene copolymer) for being expanded between an outer circular plane ring face (28o, shown in FIG. 7a) of the expanding ring (28) and the conical inner ring (7) on the straight planar ring face. Its opposite face is arranged for climbing onto the conical shallow angle ramp of the steel element ring (17, 18).

In addition to components discussed in connection with previous view, a PEEK-ring (15) with a rectangular cross-section and residing inside the inner ring (7) to seal between the inner ring (7) and the mandrel (24). All jointly moving parts are denoted with 61.

A ratchet lock ring detail, positioned between a sliding sleeve (3) and an actuator sleeve, is also shown. It is shown a ratchet ring (10R) engaging with ratchet threads (24R). It is also shown a backup ring (14) for an O-ring (1) for sealing between sliding inner sleeve (3) and a static end sub sleeve (2), to prevent leakage through axially directed slots (4S) past force transfer key (4).

At the bottom of the page and in addition to what has been discussed in the previous view, force transfer keys (4) for connecting the tool-engageable sliding inner sleeve (3) with the external actuator sleeve and axially directed slots (4S) are shown. Finally, socket head screws (20) that lock force transfer keys (4) to force transfer sleeve (9) may be seen.

Figure 6B:
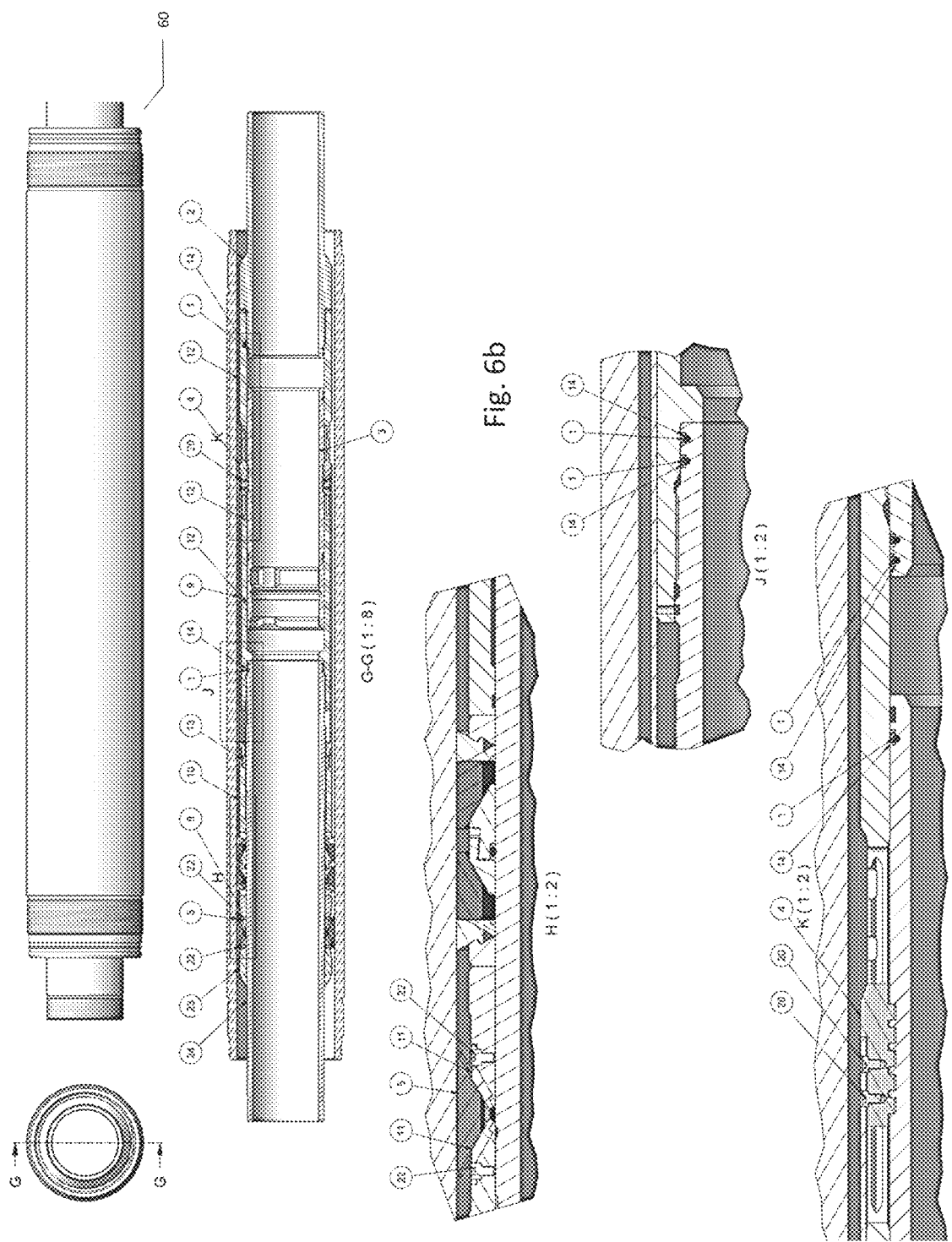

FIG. 6b shows views corresponding to those of FIG. 6a, but in the set state of the casing packer assembly. Accordingly, it is shown a mechanical casing packer assembly in set state against the inner wall of casing, with expanded slips and expanded packer assembly. A reference is here made to the discussion in connection with FIG. 6a.

FIG. 7a and FIG. 7b illustrate a first embodiment of an expanding ring of the invention, also shown in FIG. 8a. In this embodiment, the expanding ring (28) is made in one solid piece of steel.

In the upper left corner of FIG. 7a, an expansion ring with packer element is shown in axial view. A right-hand helical cut slit (28a) may be seen. Further, axially outward conical face (28ro) for climbing on the conical face of an outer ring (not shown) may be seen. An inner radial limiter rim (28iL) is also shown.

Below is a perspective view of an angled expansion ring. Here, a shallow notch cut (28n) extending all the way down to the beginning of a slit portion may be seen. A slit path (28s) extends from the notch (28n) and to the opposite rear face. A plane outer ring face (28o) is arranged to expand and meet the corresponding outer ring-shaped face of the packer element, i.e. the element end ring of FIG. 6a. Cross-sectional views, along the line A-A, B-B respectively C-C are also shown. In A-A section, a plane, arc-shaped sector recess bottom (28b) onto and along which the tongue moves peripherally is shown. A shallow notch (28n) has beveled end surfaces 3.0 to 4.0 mm deep to the beginning of plane-parallel initial slit (the depth of the notch could be between ⅒ and ⅐ of the axial direction thickness of the expanding ring, here 24.9 mm, in a preferred embodiment ⅛ of the thickness). In B-B section, a shallow plane slit portion (28sp) at 3.0-4.0 mm depth along ring surface to the beginning of a shallow-angle inclined slit (28a) through to opposite rear face is shown. An inner radial limiter rim (28iL) may eventually meet outer radial limiter rim of the outer ring and stop further expansion. In C-C section, a plane outer ring face (28o) for expanding and meeting the corresponding outer ring-shaped face of the packer is shown. Also, an inclined conical ramp face (28i) for expanding and climbing on the steep conical ramp ring (not shown here) may be seen. A rear face (28r) of the conical rear surface may be seen, as well as a shallow-angle inclined slit (28a) through to the opposite rear face (28r).

In the upper left corner of FIG. 7b, an expansion ring with outer element is shown in axial view. Here, an axially outward conical face (28ro) for climbing on the conical face of the outer ring (not shown) may be seen. A part-radial expansion slits (28x) for reducing required axial load for expansion of the entire expanding ring so that it climbs on the conical face of outer ring is also shown. Below is a perspective view of an angled expansion ring. Here, a rear face (28r) and axially outward conical face (28ro) for climbing on the conical face of outer ring (6) and an inner radial limiter rim (28iL) are shown. In the cross-sectional view, along the line A-A, an arc-shaped tongue (28te) of 3.0-4.0 mm thickness along ring surface is shown. In the non-expanded embodiment, the tongue is separated from the rest of the expanding ring by a shallow plane slit portion (28sp). An opposite, rear face (28r) is also shown. In the remaining views, the opposite rear face (28r) and slit (28s), its angled (helical) slit portion (28a).

FIG. 8 is a detailed longitudinal section of a casing packer seal assembly according to the invention, before set and after set. In the upper section of FIG. 8, the ready-for-set casing packer seal assembly (100) is shown, and in the lower section of FIG. 8, the same casing packer assembly (100) is shown in its set position, wherein a moving ratchet housing (10) is forced in from below by a tool and the expanding rings (28) and the packer end elements (16) have been expanded such that they seal against the surrounding casing wall (only shown in the lower half of FIG. 8). For the sake of brevity, assembly components discussed in connection with FIGS. 6 and 7 are not discussed again. Inner and outer limiter ring (6iL, 6oL) of the conical outer ring (6) are shown. A lateral, axially-directed force (represented by an arrow) is applied to the assembly, resulting in an axial displacement, but also an upwards movement of the components.

For the ready-to-set position, see respective upper section of FIGS. 8-8c as well as FIG. 9a. The shown casing packer seal assembly (100) comprises at least one packer element ring (16) having mutually opposite, axially outward facing radially inner and outer plane ring portions (16o, 16i), see entire FIG. 8 and lower section of FIG. 8a. FIG. 8a shows a cross-section of the solid ring assembly corresponding to FIG. 7a and FIG. 7b Here, the outer plane ring surface (16o) of the packer (16) is compressed, by means of the force Fset, and radially expanded (expansion direction of the packer end element is denoted by a black arrow) against the expanded arc-shaped tongue (28te) of the expanding ring (28) and the inner plane ring surface (16i) is compressed and abuts against the inner plane ring surface of the conical inner ring (7). The same effect is also shown in FIG. 8b, lower section, and in FIG. 8c, lower section.

FIG. 8b shows a cross-section of an embodiment of the expanding ring (28) with two internal expanding rings (corresponding to what is shown in FIG. 9a and FIG. 9b) and is a principle longitudinal section of second embodiment of a casing packer seal assembly before set (upper section of the FIG.) and after set (lower section of the FIG.). In addition to features shown and discussed in connection with FIGS. 6-8a, a fixed base shoulder portion (28bs) of the expanding ring (28) and a peripheral, circumferential groove (28gr) for housing the first and second internal expanding rings are shown (28ai, 28bi), both being part of the expanding ring (28). In FIG. 8b, the end-element facing tongue (28te) has end support on outside of slit-cut base shoulder portion (28bs) of the expanding ring (28), and also on the plane surface of the first internal expanding ring (28ai).

FIG. 8c shows a cross-section of an embodiment of the expanding ring (28) with a conical stack of three frontal expanding disc rings (28d1, 28d2, 28d3) ahead of the base expanding ring, all three expanded together with the packer element end ring (16) due to the compression force. The first expanding disc ring (28d1) forms the tongue (28te). The expanded arc-shaped tongue (28te) forms part of the expanded outer plane ring surface (28o) of the expanding ring (28) to encounter the outer plane ring portion (16o) of the expanded packer.

FIG. 9a illustrates a longitudinal section along an embodiment of the casing packer seal assembly of the invention, wherein the expanding ring (28) is designed according to a second embodiment of the invention. Note the overlap of a tip of the arc-shaped expanded tongue (28te) and a base portion of the shoulder portion (28bs), contributing to this fully expanded ring not collapsing axially under axial load. A first and a second internal expanding rings (28ai, 28bi) wherein the first internal expanding ring (28ai) has a plane surface that partly supports the tongue (28te). A conical shaped inner ring (7; with ramp face 7r and a plane ring face 7i) and a slit (28s) may also be seen.

FIG. 9b illustrates a perspective view of an expanded gap formed in the base expanding ring part of the above mentioned second embodiment of the expanding ring, the internal expanding ring is omitted from the FIG. 9b. In FIG. 9b, the plane surface (28b) is the recess bottom (28b), which also is the bottom face formed by a slit plane (28sp) in the non-expanded state of the expanding ring (28). An inner radial limiter rim (28iL) limits radial expansion of the expanding ring (28). Radially extending expansion slits (28x) reduce required axial force. A gap (28g) may also be seen. A peripheral, circumferential groove (28gr) houses the first and second internal expanding rings (28ai, 28bi) of FIG. 9a. An arc-shaped tongue (28te) of 3.0-4.0 mm thickness along ring surface (28o) is in the non-expanded embodiment separated from the remainder of the expanding ring by the shallow plane slit portion (28sp). The end-element facing tongue (28te) has end support on outside of slit-cut base shoulder portion (28bs) of the expanding ring (28). A beveled notch face (28nb) is also shown. A straight cut slit (28c) is part of a slit path (28s). In this embodiment, planar slit portion (28sp) is continued in this cut (28c). The entire slit path (28s) here comprises planar slit portion (28p) and straight cut slit (28c).

FIG. 9c illustrates the embodiment of the expanding ring assembly with the expanding ring (28) with two internal expanding rings (28ai, 28bi) both arranged between an inner cone ring (7) for facing the packer end element (16) and an outer cone ring (6), the two cone rings handling axial forced radial expansion of the packer seal rings. A corresponding expanding ring assembly is to be arranged opposite the expanding ring (28). An opposite rear face (28r) is also shown. In the assembled, nonexpanded ring drawing, a slot (28ais) in the first internal expanding ring (28ai) is shown.

FIG. 10 is a perspective of an expanded ring of the embodiment shown in FIG. 9c, and an enlarged portion of the gap-forming portion showing the arc-shaped recess bottom which will be forced against the packer end element (16) plane outer rim portion (16o; part of which will be deformed into the recess). The recess here has beveled ramp surfaces against the packer end element, and it is rather shallow, so the deformation bulge-out of the outer rim portion (16o) into the groove is so small that rupture deformation of the packer end element (16) is avoided. The straight gap at the rear portion of the expanding ring, where metal is in contact with metal, is less significant, except for the gap itself, which is mechanically supported across the dual internal expanding rings (28ai, 28bi). An inner plane ring surface (7i) of the inner ring (7) may be seen. A gap-forming shallow notch (28n) is shown. One advantage of this embodiment is that the arc-shaped recess bottom (28b) and the outer ring-shaped plane of the first piston ring (28ai) behind the shallow plane slit (28p) at 3.0-4.0 mm depth along ring surface (28o) is all that ever is exposed towards the packer (16). The axial extrusion of the ring-shaped outer part of the packer element (16) is then only about 3-4 mm. An opposite, rear widening gap (28wg) expanded by conical outer ring is also shown. A rear face (28r) of the expanding ring may also be seen.

FIG. 11 is an embodiment of the invention, showing a third embodiment of the expanding ring (28) comprising a rear conic base ring (28Y) and including a fore, internally conic, stack of three discs (28d1, 28d2, 28d3) which are fixed together at one point with the base ring, all in an unexpanded state. Each disc (28d1, 28d2, 28d3) has a cut gap so that it may expand. The radially slimmest disc (28d3) may have a notch (28n) forming the slit/gap (28g1) which forms part of a through-slit (28s). Assembly screw connections (28Ys) are also shown.

The slit path (28s) runs from slit (28g1) in first split ring (28d1), then between first split ring (28d1) and second split ring (28d2) to second slit (28g2) in second split ring (28d2), then in the same manner between second split ring (28d2) and the third split ring (28d3) to the third slit (28g3), then between the third split ring (28d3) and the base ring and further to a rear split (28br) in the base ring. A shallow notch (28n) in ring is forming gap (28g) in plane outer ring face upon expansion of the assembled expanding ring. In the left corner of FIG. 11, a base expanding ring (28be) and the three conical disc rings (28d1, 28d2, 28d3) are shown. The portion adjacent to slit (28g1) in first, outer, slimmest expanding disc (28d1) forms the arc-shaped tongue. In the following, angles between gaps through the expanding ring (28) will be discussed:

from assembly screw connection (28Ys) to notch (28n) and/or first slit (28g1) in the first expanding disc ring (28d)–75°.

from notch (28n) and/or the first slit (28g) in the first expanding disc ring (28d1) to the second slit (28g2) in the second expanding disc ring (28d2)–90°.

from the second slit (28g2) in the second split ring (28d2), to the third slit (28g3)–45°.

from the third split (28g3) to the rear split (28br) in the base ring (28be)–180°.

This entails that behind the first slit (28g1) there will be a double expanding disc ring supporting 75° behind, and 90° ahead, along and behind supporting the outer arc-shaped plane face (28o). The base expanding ring (28be) behind these two expanding rings will have support 45° behind and "endless" ahead of the base expanding ring (28be). This increases the mechanical strength of the support under the arc-shaped plane face (28o; shown in FIG. 12) and the recession bottom (28b; shown in FIG. 10) formed by the expanding arc-shaped gap (28g), thus buckling of the expanding ring (28) is prevented, and undesirable further yield of the packer end element (16) is prevented.

FIG. 12 is a cross-section of the expanding ring (28) shown in FIG. 11. An expanding ring (28) with three discs is shown in non-expanded state. Each disc (28d1, 28d2, 28d3) has a cut gap for being expanded. The radially thinnest disc may have a notch forming the slit/gap. The expanding ring (28) comprises an expanding base part and three expanding discs (28d1, 28d2 and 28d3; visible also in FIG. 11) of which the inner expanding disc forms the tongue. The base part may have slits. The remaining components have been discussed in connection with previous FIGS.

Moreover, the casing packer seal assembly (100) comprises: first and second conical inner rings (7, 7r) having an axially inward directed plane ring face (7i) abutting said at least one packer element end rings' (16) inner plane ring portions (16i) in the expanded state.

In addition, the casing packer seal assembly (100) comprises: first and second expanding rings (28) each having a conical ramp face (28i) for climbing, thus expanding, on said conical inner rings (7); said first and second expanding rings (28, 28) each having a plane, radially outer ring face (28o) for engaging, expanding with and supporting said packer element end ring's (16) axially outward facing plane ring portions (16o). Once again, see respective lower section of FIGS. 8a-8c.

The effect conferred by the above components is, when the expandable portions of the casing packer seal assembly have been compressed and expanded, to prevent extrusion of the expanded packer element end ring (16) in an annulus gap between the expanding rings (28) and a surrounding casing pipe.

In practice, the casing packer assembly is axially dual-sided as illustrated in FIG. 6a, FIG. 6b, and FIG. 8, and particularly the arrangement of the packer end element (16) with a bi-conical central element (17, 18), is more elaborate than the single packer element (16) solution shown in FIG. 8a, FIG. 8b, and FIG. 8c.

Direction Definitions

When defining directions of the casing packer seal assembly (100), we define an origin in the axial direction.

The middle plane of the casing packer assembly (100) is defined, see FIG. 8, to be in the middle axial transverse plane of the bi-conical central element (17, 18). The casing packer assembly is to a substantial extent, in practice out to the outer rings (6), axially symmetrical about this middle plane. Accordingly, the middle plane moves during compression and setting. The direction denoted "axially inward" is everything facing in a direction towards the middle plane. The direction denoted "axially outward" denotes everything facing in a direction away from the middle plane of the middle, bi-conical central element (17, 18). When axially compressed, both expandable packer element end rings (16), typically made of rubber-like material, such as TFE/P, will ramp up and move laterally towards each other against the bi-conical element. It is to be noted in FIG. 8 that the middle plane of this assembly will itself translate axially, during the compression because the active ratchet housing (10; shown coming in from the right side in FIG. 8, which is from below when in a well) will compress from one side and push the assembly to the left side in FIG. 8 and towards an ultimate fixed point, regardless of whether casing slips are present or not.

In such an embodiment, said packer element (16) is arranged as follows, see also FIGS. 6a-6b and FIG. 8:

first and second packer element end rings (16) have mutually opposite axially outward facing plane outer and inner ring portions (16o, 16i), respectively, wherein the first and second packer element end rings (16) each have an axially inward directed conical ramp portion (16r), and there is arranged a central, bi-conical central element (17, 18) for ramping out the first and second packer element end rings (16).

In an embodiment, a sealing O-ring (26) is arranged between the two facing portions of the opposite bi-conical central element (17, 18) and another sealing O-ring (25) is arranged under the bi-conical central element (17, 18) to seal against the cylindrical surface of the mandrel (24), see FIG. 8.

In an embodiment of the invention shown in FIG. 8, the casing packer seal arrangement (100) further comprises that said sliding casing packer seal assembly (100) is arranged for being set by axial compression between a sliding, moving ratchet housing (10), and an axially opposite arranged, slips ring (8) which may be considered immobilized relative to the moving ratchet housing (10), see FIG. 8, but also FIG. 6a and FIG. 6b In an embodiment of the invention, the slips ring (8) also slides towards slips (5) and ultimately against a fixed slips end ring (23) on said mandrel (24), see also FIG. 6b for the set state of both packer and slips and FIG. 6a for the pre-set state. In such an embodiment of the invention, the casing packer seal arrangement is combined on the same mandrel (24) with wedge-based slips (5) arranged to be forced out by the conical slips ring (8) and the oppositely arranged slips end ring (23).

As shown in the embodiments of FIG. 6a, FIG. 6b. FIG. 8, FIG. 8a, FIG. 8b, FIG. 8c, and FIG. 9a, the casing packer seal arrangement may have further components to promote the expansion which are also advantageous in order to limit undesired radial expansion of the expanding ring. In such embodiments there are arranged first and second conical outer rings (6), wherein the conical outer rings are arranged between an axially outward facing conical, radially expanding ramp face (28r) of said expanding rings (28), and said moving ratchet housing (10) on the one axial side and said (relatively static) slips ring (8) on the axially opposite side. Correspondingly, in the embodiment the conical outer rings (6) have an axially inward facing conical ramp (6ri) for expanding the axially outward facing conical ramp (28ro) of said expansion ring (28), see FIG. 8a, and the same feature is shown in FIG. 8b and FIG. 8c. This feature promotes the radial expansion of the expanding ring (28). In an embodiment the conical outer rings (6) could have been manufactured as integrated portions on the ratchet housing (10) and the slips ring (8), respectively, in order to reduce the number of components.

In an embodiment, and in order to limit radial expansion, the axially inward facing conical ramp (6ri) of said outer ring (6) is provided with a radially outer limiter rim (6oL) arranged for outer limiting of the radial expansion of a corresponding radially inner limiter rim (28iL) of said axially outward facing conical ramp (28ro) of said expanding ring (28). The limiter rims (6oL) and (28iL) are radially abutting during compression and are advantageous to have in order to avoid uncontrolled radial expansion of the expanding ring. The expanding ring would, if not restricted radially, collapse outwardly and axially in the annulus.

In an embodiment of the invention, the casing packer seal arrangement may further comprise said sliding, moving ratchet housing (10) having an internal ratchet ring (10r; see also FIG. 6a) arranged for locking said ratchet housing (10) when in its axially compressed position, and for locking it against corresponding external ratchet threads (24R) on said mandrel (24), preventing thereby reversal and unloading of the compression of the casing packer seal arrangement.

The ratchet threads (24R) may be ring threads in case of permanent ratchet locking. But in an embodiment, the ratchet threads (24R) may also be screw threads if the casing packer shall be used in a resettable packer such as in a retrievable bridge plug. For use of the present packer seal assembly (100) in a retrievable bridge plug, the mandrel needs to be rotated in order to unscrew the ratchet lock. Otherwise, if first set, it cannot be unset. This is regardless of whether there are slips arranged or not, but it is in practice required to have both packer and slips in a retrievable bridge plug.

It is required to apply a force to compress the casing packer assembly (100). One may assume that the external casing such as 13⅜" is fixed in the well, and that a 9⅝" casing with the present packer seal arrangement (100) is placed and held in its desired position prior to being set. In order for this to be achieved for a casing packer, said ratchet housing (10) is connected via a set of force transfer keys (4) fixed to said ratchet housing (10) and radially arranged through axially directed force transfer slots (4s) through said mandrel (24) or a packer mandrel (12) or end sub sleeve (2) in the continuation of said mandrel (24), see FIG. 6a and FIG. 6b Those force transfer keys (4) are then connected to a slidable inner sleeve (3) inside said mandrel (24) or said packer mandrel (12) or end sub (1). This slidable inner sleeve (3) is then provided with an internal key profile (3K) for receiving a dog key tool for axial translation of said inner sleeve (3). The dog key tool may then be run on a drill pipe string but it may also be envisaged that it may be handled via a well tractor, wireline or rod-conveyed or autonomous, such that it travels to a position inside mandrel (24), anchors itself inside the mandrel (24) and extends an actuator with the desired dog key profile and moves the sliding sleeve (3) to set the casing packer. The dog key tool may also be supplied on a conveyed tubing.

Based on the invention and its embodiments described above, we envisage a first, second and third embodiment of the invention's expanding ring (28), where:

the expanding ring (28) is provided with a shallow notch cut (28n) in said radially outer ring face (28o) extending down to a slit path (28s), see FIG. 7a and FIG. 7b, which slit path (28s) extends in general to an opposite, outward facing rear face (28r) of said expanding ring (28). This will allow peripheral, i.e. radial, expansion of said expanding ring (28) along said slit path (28s). As seen from the packer end element's side, the expansion of the expanding ring commences at the notch cut (28n) and a shallow groove bottom is exposed in the radially outer ring face (28o), allowing only a short arc-shaped axial-directed extension of the packer end element. In an embodiment of the invention, the shallow notch (28n) may have a depth of about 2-5 mm, in a preferred embodiment a depth of 3 to 4 mm, and in a most preferred embodiment a depth of 3.2 to 3.8 mm. The above features are also present in the embodiments illustrated in FIG. 8, FIG. 8a, FIG. 8b, FIG. 8c, FIG. 9a and FIG. 9b. FIG. 9c, FIG. 10, FIG. 11, and in FIG. 12, although the actual slit path (28s) is of various embodiments in the three variants illustrated.

In an embodiment which is also common to the three embodiments of the expanding ring (28) shown in FIG. 8a, FIG. 8b, and FIG. 8c, the slit path (28s) has a shallow, planar slit portion (28sp) beginning from said shallow notch (28n), said planar slit portion (28sp) allowing, during expansion, for a shallow, planar, peripherally widening arc-shaped recess bottom (28b) uncovered between the peripherally widening notch gap's (28n) opposite faces, said planar slit portion (28sp) underlying an arc-shaped tongue (28te) of even thickness along the length of said planar slit portion (28sp). The planar slit portion (28sp) may then have its continuation in various ways through the remainder of the slit path (28s) to the opposite face (28r) of the expanding ring (28).

In an embodiment of the invention, these first, second and third embodiments of the expanding ring (28) have in common that a peripheral length of said planar slit portion (28sp) and a length of said arc-shaped tongue (28te) is longer than a maximally allowed peripheral widening of said expanding ring (28), so that only said, planar, peripherally widening arc-shaped recess bottom (28b) of said slit (28s) is exposed to said packer end element (16) during expansion.

A significant advantage of this shallow, planar, peripherally widening arc-shaped recess bottom (28b) is the fact that the arc-shaped recess bottom (28b) behind the shallow plane slit (28sp) at 3.0-4.0 mm depth along ring surface (28o) generally forms the plane recess exposed towards the packer (16). No further slit gap is exposed to the packer element (16), thus no extrusion of the outer rim of the packer element is allowed even under high pressure. The axial extrusion of the ring-shaped outer part of the packer element (16) is then only about 3-4 mm.

Also, common to the first, second and the third embodiment of the expanding ring (28) is a further embodiment that the feature of said notch cut (28n) comprises two oppositely-facing beveled surfaces (28nb), see FIG. 7a, FIG. 7b, FIG. 9b, and FIG. 10 in particular, and that the arc-shaped tongue (28te) comprises one of said beveled surfaces (28nb) at its end. An advantage of this feature is that there is no sharp edge scraping away along the affected outer planar rim (16o) of the packer end element (16), but only a beveled, low-angle end portion as the arc-shaped tongue is peripherally moving away during its expansion, and no sharp edge to initiate a cut in the outer planar rim (16o) as the pressure is set on the packer end element (16). This reduces the risk of damage to the edge and planar rim (16o) of the packer end element (16) and contributes to maintaining the sealing effect of the packer end element.

In an embodiment of the invention, mutually expansion-sliding portions of said expanding ring (28), including at least said planar, peripherally widening arc-shaped recess bottom (28b) uncovered between said peripherally widening notch gap's (28n) opposite faces, said planar slit portion (28sp) underlying these, and including, said arc-shaped tongue (28te), are all surface-covered by a low-friction material such as Tetrafluoroethylene (Teflon, TFE), Molykote (R) D321 R, Xylene, Si-grease, or similar that withstands a temperature of up to 170° C. or even up to 260° C. There are several advantages to this embodiment. It reduces the friction during the setting process, it reduces the local heat development during the setting process, and it thus reduces the wear and tear on the expanding ring (28) and in particular reduces the wear and tear on the expanding packer end element (16).

In an embodiment of the invention, the casing packer with slips is arranged for withstanding a pull of 136.2 tons in its set state. In an embodiment of the invention, the casing packer seal arrangement (100) is arranged for the force pulled on the inner sleeve of 30 ton or 30000 kgf, or 294000 N. However, it has been established that the expanding ring (28) and the packer end element (16) for a 9⅝" casing packer are fully expanded and set in the surrounding casing already at a pulling force of about 3.5 tons, corresponding to 3500 kgf or 34300 N. In case of a 13⅝" casing packer, the ring and the end element are fully expanded at about 3.9 tons, corresponding to 3900 kgf or 38250 N.

An advantage conferred is that the casing packer assembly of the present invention is easily set and it is able to tolerate a high setting force and will expand and seal early. A further advantage is that when "crossing" over to an opposite annular pressure, e.g. from a pressure from below such as in FIG. 1a, to a pressure from above, the axial force on the packer seal may shift, but the axial force required to maintain the expanding ring (28) in the set state is comparably rather low, so the ratchet-set force of 30 tons is sufficient to ensure the complete sealing effect.

In an embodiment of the invention illustrated in FIG. 7a, FIG. 7b, FIG. 8, and FIG. 8a, said slit path (28s) comprises a transition from said planar slit portion (28sp) to a low-angle helical slit portion (28a) further towards said opposite rear face (28r) of said expanding ring (28). In this embodiment said expanding ring (28) is made of a single piece of material. The end of the helical slit portion may be cut-off straight in order to avoid deformation of the final sharp end, see FIG. 7a.

In another embodiment of the invention and with respect to the expanding ring (28), said slit path (28s) comprises a transition from said planar slit portion (28sp) to a generally transverse cut high-angle slit portion (28c), see FIG. 8b, FIG. 9a, and in particular FIG. 9b, and FIG. 9c, said high-angle slit portion (28c) continues towards said opposite rear face (28r) of the expanding ring (28).

In a further embodiment and still with respect to the expanding ring (28), as shown in FIG. 8b, FIG. 9a, and in particular FIG. 9b, and further in FIG. 9c, there is a circumferential, peripheral groove (28gr) with plane walls, arranged circumferentially in said expanding ring, wherein said peripheral, circumferential groove (28gr) houses first and second internal expanding rings (28ai, 28bi),
at least one of said expanding rings (28ai, 28bi) has a slot, and
said expanding rings (28a, 28bi) having their respective slots at mutually different peripheral angles and also with regard to a peripheral position of said notch (28n) and said planar slit portion (28sp).

In this embodiment, the continuous, non-slotted sections of the inner expanding rings (28ai, 28bi), i.e. all sections except for those in vicinity of the slots, have good mechanical bending moment resistance in the axial-orthogonal plane, in order to serve as a double ring layer (28ai, 28bi) for supporting the arc-shaped gap revealing behind the tongue (28x). This prevents buckling-in of the expanding ring (28) when subject to high axial load and local pressure-induced loads from the packer end element (16), thus reducing the risk of undesired extrusion of packer end element (16).

One advantage of this embodiment is that the combined expanding resistance stiffness of the expanding ring (28), the U-shaped bottom ring and including the first and second internal expanding rings (28ai, 28bi) is reduced, both individually and combined as compared to an expanding ring which is solid in its entire cross-section. Thus, it is reasonable to assume that the expanding ring (28, 28ai, 28bi) is more flexible to adapt to and thus follow the actual inner surface shape of the surrounding casing pipe where the packer shall be set. In the embodiment shown in FIGS. 8b, 9a, and 9c, cross-section of each internal expanding ring (28ai, 28bi) has a Gamma-like shape (r) with a wider radially outer portion and a narrower stem portion.

In an embodiment of the invention (shown in FIG. 9c), the first internal expanding ring (28ai) has an outer plane circular surface (28aib) which is forming part of said shallow, planar, peripherally widening arc-shaped recess bottom (28b) that is uncovered between the peripherally widening notch gap's (28n) opposite faces, said planar slit portion (28sp) underlying said arc-shaped tongue (28te) of even thickness along the entire length of said planar slit portion (28sp).

In an embodiment of the invention, radial expansion slits (28x) are arranged, see FIG. 7b, FIG. 9b, FIG. 9c, said slits (28x) are cut in from a radially inner face of said expanding ring (28). The expansion slits (28x) reduce widening bending moment resistance stiffness of said expanding ring, thus reducing the axial force required for fully expanding the expanding ring (28).

One further advantage of this embodiment, combined with the above generally transverse cut high-angle slit portion (28c) towards said opposite rear face (28r) of said expanding ring (28), is that the peripheral length of the total slit (28s) becomes relatively short, and the remaining length available for distributing the slits (28x) becomes correspondingly long, so as for allowing many of those radial slits (28x) distributed radially internally along the inner periphery of the "intact" expanding ring (28), thus allowing a better distributed, more even peripheral bending moment resistance around the expanding ring. The ring thus becomes better enabled to adapt to a non-perfect inner wall of a casing pipe to be sealed, without compromising on the axial loading properties of the expanding ring (28).

In an embodiment of the invention, see FIG. 9c, lower section, said internal expanding rings (28ai, 28bi) are mutually fixed by an axially extending fixing screw (28f) across said circumferential groove (28gr) in one common position on said expanding ring (28), said common position being located peripherally at least 30° away from said gaps of said internal expanding rings (28ai, 28bi) and said notch gap (28n).

In an embodiment of the invention, by way of example shown in FIG. 9b and in FIG. 9c, the middle part, the peripheral, circumferential groove (28gr) profile has a base shoulder portion (28bs) which extends behind said planar slit (28sp), so as to, together with said expanding inner ring (28ai), support said arc-shaped tongue (28te) for facing said packer end element (16). An advantage of this embodiment is that when the arc-shaped gap that is formed as the tongue (28te) slides open, the radially lower portion of the tongue (28te) always has a physical support from the base shoulder portion (28bs). When the ring (28) expands, the radially packer-facing face of the base shoulder portion (28bs) forms part of the shallow arc-shaped recess which mechanically supports the outer plane ring face portion (16o) of the expanding packer.

In yet another embodiment of the invention and still with respect to the expanding ring (28), said expanding ring (28) comprises:
a slotted base expanding ring (28Y) connected to an internally conic, expanding disc ring stack (28d3, 28d2, 28d1), see FIG. 8c, FIG. 11, and FIG. 12. The expanding disc stack (28d3, 28d2, 28d1) comprises
a third, slotted (28g3), internal-conically beveled expanding disc ring (28d3),
a second, slotted (28g2), internal-conically beveled expanding disc ring (28d2),
a first, slotted (28g1, 28n), internal-conically beveled expanding disc ring (28d1), wherein said first slot forms said first slit gap (28n);

Said slotted base expanding ring (28Y) and expanding disc ring stack (28d3, 28d2, 29d1) are connected by an assembly screw connection (28Ys) at a peripheral position away from said first slot (28g1, 28n). The first slotted expanding disc ring (28d1) is the one which forms the ring-shaped outer face (28o) which encounters the radially plane outer ring face portion (16o) of the expanding packer end element (16).

In an embodiment of the invention, the peripheral angles between gaps formed by said slots (28g1, 28g2, 28g3) forming part of the slit path (28s) through the expanding ring (28). This aspect of the invention will be discussed further below.

With these peripheral angles, there will be an extensive peripheral length of arc support behind the notch (28*n*), formed by the first gap (28*g*1). Behind this first gap (28*g*1) there will be a double layer of expanding disc rings (28*d*2 and 28*d*3) supporting 75° behind, and 90° in front, along and behind supporting the outer arc-shaped plane face (28*o*).

Further, the base expanding ring behind these two expanding disc rings (28*d*2, 28*d*3) will have continuous mechanical support 45° behind and so-to-say endless in front of the base expanding ring (28*be*). This increases the mechanical strength of the support under the arc-shaped plane face (28*o*) and the recession bottom (28*b*) formed by the expanding arc-shaped ap (28*g*). Buckling of the expanding ring (28) is hereby prevented, and further yield of the packer end element (16) beyond the thickness of the expanding disc ring (28*d*1) is prevented.

Accordingly, in this embodiment of the expanding ring (28), the slit path (28*s*) extends as follows:
- from notch (28*n*) in the first split ring (28*d*1), axially adjacent plane parallel arc surfaces, then along the surfaces between first split ring (28*d*1) and the second split ring (28*d*2),
- through second slit/gap (28*g*2) in the second split ring (28*d*2), axially adjacent plane parallel arc surfaces, then further in the same manner along and between the surfaces of the second split ring (28*d*2) and the third split ring (28*d*3),
- through the third slit/gap (28*g*3), axially adjacent plane parallel arc surfaces, then further along and between the surfaces of the third split ring (28*d*3) and the base ring (28*be*), and further through the rear split (28*br*) in the base ring (28*be*).

The invention comprises a casing packer section for being inserted together with a liner, patch or casing in a casing in a well, the casing packer section comprising a casing packer seal arrangement in accordance with the above. The invention also comprises a bridge plug or a retrievable bridge plug with a casing packer seal arrangement according to the above description.

The invention claimed is:

1. A casing packer seal arrangement, comprising:
   a sliding casing packer seal assembly arranged for being set by axial compression to expand against a surrounding casing pipe, said casing packer seal assembly being compressed and sled along a cylindrical mandrel;
   said casing packer seal assembly comprising:
   at least one packer element ring having mutually opposite inner and outer plane ring portions;
   first and second conical inner rings having a plane ring face abutting said packer element end rings' inner plane ring portions in their expanded state;
   first and second expanding rings each having a conical ramp face for climbing, thus expanding, on said conical inner rings; and
   said first and second expanding rings each having a plane, radially outer ring face for engaging, expanding with and supporting said packer element end ring's plane ring portions,
   wherein when expanded, extrusion of said so expanded packer element end ring in an annulus gap between said expanding rings and the surrounding casing pipe is prevented,
   wherein said expanding ring is provided with a shallow notch cut in said radially outer ring face extending down to a slit path which extends to an opposite, outward facing rear face of said expanding ring, so as for allowing peripheral thus radial expansion of said expanding ring along said slit path, and
   wherein said slit path has a shallow, planar slit portion beginning from said shallow notch, said planar slit portion allowing during expansion for a shallow, planar, peripherally widening arc-shaped recess bottom uncovered between the peripherally widening notch gap's opposite faces, said planar slit portion underlying an arc-shaped tongue of even thickness along the entire length of said planar slit portion.

2. The casing packer seal arrangement of claim 1, wherein said packer element comprises:
   first and second packer element end rings having mutually opposite plane ring portions;
   said first and second packer element end rings having a conical ramp portion; and
   a middle, bi-conical central element for ramping out said first and second packer element end rings.

3. The casing packer seal arrangement of claim 1, wherein said sliding casing packer seal assembly is arranged for being set by axial compression between a sliding, moving ratchet housing and an axially opposite arranged slips ring which itself may be arranged sliding towards slips to set said slips which may ultimately face against a fixed slips end ring on said mandrel.

4. The casing packer seal arrangement of claim 3, wherein there is arranged first and second conical outer rings, said conical outer rings arranged between a conical, radially expanding ramp face of said expanding rings, and said moving ratchet housing on the one axial side and said slips ring on the axially opposite side, said conical outer rings having a conical ramp for expanding a conical ramp of said expansion ring.

5. The casing packer seal arrangement of claim 4, wherein said conical ramp of said outer ring is provided with a radially outer limiter rim arranged for outer limiting the radial expansion of a corresponding radially inner limiter rim of said conical ramp of said expanding ring.

6. The casing packer seal arrangement of claim 3, wherein said sliding, moving ratchet housing comprises an internal ratchet ring arranged for locking said ratchet housing when in its axially compressed position, to corresponding external ratchet threads on said mandrel, preventing reversal and unloading of the compression of the casing packer seal arrangement.

7. The casing packer seal arrangement of claim 3, wherein said ratchet housing is connected via a set of force transfer keys fixed to said ratchet housing and radially arranged through axially directed force transfer slots associated with said mandrel or a packer mandrel or end sub sleeve in the continuation of said mandrel, said force transfer keys connected to a slidable inner sleeve inside said mandrel or said packer mandrel or end sub, said slidable inner sleeve provided with an internal key profile for receiving a dog key tool for axial translation of said inner sleeve.

8. The casing packer seal arrangement of claim 1, wherein a peripheral length of said planar slit portion and a length of said arc-shaped tongue is longer than a maximally allowed peripheral widening of said expanding ring, so as for only said planar, peripherally widening arc-shaped recess bottom of said slit to be exposed to said packer end element during expansion.

9. The casing packer seal arrangement of claim 1, wherein said notch cut comprises two facing opposite beveled surfaces, said arc-shaped tongue comprising one of said beveled surfaces at its end.

10. The casing packer seal arrangement claim 1, wherein mutually expansion-sliding portions of said expanding ring include at least:

said planar, peripherally widening arc-shaped recess bottom uncovered between said peripherally widening notch gap's opposite faces; and said planar slit portion underlying said arc-shaped tongue, and all are surface-covered by a low-friction material.

11. The casing packer seal arrangement of claim 10, wherein the low-friction material is tetrafluorethylene, a lubricant having molybdenum disulfide and graphite, or xylene.

12. The casing packer seal arrangement of claim 10, wherein the low-friction material is a material withstanding a temperature of up to 170° C.

13. The casing packer seal arrangement of claim 1, wherein said slit path comprises a transition from said planar slit portion to a low-angle helical slit portion towards said opposite rear face of said expanding ring, said expanding ring being made of one single material part.

14. The casing packer seal arrangement of claim 1, wherein said slit path comprises a transition from said planar slit portion to a generally transverse cut high-angle slit portion towards said opposite rear face of said expanding ring.

15. The casing packer seal arrangement of claim 14, wherein:

a circumferential peripheral groove with plane walls, arranged circumferentially in said expanding ring, said peripheral, circumferential groove housing first and second internal expanding rings, said expanding rings having a slot, said expanding rings having their slot at mutually different peripheral angles and also with regard to a peripheral position of said notch and said planar slit portion.

16. The casing packer seal arrangement of claim 15, said first internal expanding ring having an outer plane circular surface forming part of said shallow, planar, peripherally widening arc-shaped recess bottom uncovered between the peripherally widening notch gap's opposite faces, said planar slit portion underlying said arc-shaped tongue of even thickness along the entire length of said planar slit portion.

17. The casing packer seal arrangement of claim 15, wherein said expanding rings are mutually fixed by an axial-parallel fixing screw across said circumferential groove in one common position on said expanding ring, said common position peripherally at least 30 degrees away from said gaps of said internal expanding rings and said notch gap.

18. The casing packer seal arrangement of claim 15, said peripheral, circumferential groove having a base shoulder portion behind said planar slit, so as for, together with said expanding inner ring, supporting said arc-shaped tongue for facing said packer end element.

19. The casing packer seal arrangement of claim 1, further comprising expansion slits extending radially from a radially inner face of said expanding ring, said expansion slits for reducing widening resistance stiffness of said expanding ring, thus reducing required axial setting force.

20. The casing packer seal arrangement of claim 1, wherein said expanding ring comprises:

a slotted base expanding ring connected to an internally conic, expanding disc ring stack comprising:

a third, slotted, expanding disc ring;

a second, slotted, expanding disc ring; and a first, slotted, expanding disc ring wherein said first slot forms said first slit gap, and part of said expanding disc ring forms said arc-shaped tongue, wherein said slotted base expanding ring and expanding disc ring stack are connected by an assembly screw connection at a peripheral position away from said first slot.

21. A casing packer comprising the casing packer seal arrangement of claim 1.

22. A retrievable bridge plug comprising the casing packer seal arrangement of claim 1.

\* \* \* \* \*